(12) United States Patent
Yuan et al.

(10) Patent No.: US 12,133,096 B2
(45) Date of Patent: Oct. 29, 2024

(54) DATA TRANSMISSION METHOD, APPARATUS, AND DEVICE

(71) Applicant: HUAWEI TECHNOLOGIES CO., LTD., Shenzhen (CN)

(72) Inventors: Liping Yuan, Beijing (CN); Haipeng Fang, Beijing (CN); Xin Cai, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 17/560,929

(22) Filed: Dec. 23, 2021

(65) Prior Publication Data
US 2022/0116798 A1 Apr. 14, 2022

Related U.S. Application Data

(63) Continuation of application No. PCT/CN2020/097625, filed on Jun. 23, 2020.

(30) Foreign Application Priority Data

Jun. 28, 2019 (CN) .......................... 201910578156.0

(51) Int. Cl.
*H04W 24/02* (2009.01)
(52) U.S. Cl.
CPC .................................. *H04W 24/02* (2013.01)
(58) Field of Classification Search
CPC ............. H04W 24/02; H04W 28/0278; H04W 40/36; H04W 28/0236; H04W 40/12
See application file for complete search history.

(56) References Cited

U.S. PATENT DOCUMENTS

| 5,784,406 | A | 7/1998 | Dejaco et al. |
| 2010/0238811 | A1 | 9/2010 | Rune |
| 2014/0313920 | A1 | 10/2014 | Chai et al. |
| 2018/0176325 | A1* | 6/2018 | Liang .................... H04L 67/568 |
| 2018/0262924 | A1* | 9/2018 | Dao ....................... H04W 24/08 |

(Continued)

FOREIGN PATENT DOCUMENTS

| CN | 101562561 A | 10/2009 |
| CN | 103002496 A | 3/2013 |

(Continued)

OTHER PUBLICATIONS

Ericsson, "Email discussion [105#53] [LTE_NR_DC_CA_enh-Core] Early measurements Signaling", 3GPP TSG-RAN WG2 Meeting #105bis R2-1904553, Xi'an, P.R. China, Apr. 8-12, 2019; 35 total pages.

*Primary Examiner* — Jae Y Lee
(74) *Attorney, Agent, or Firm* — Rimon PC

(57) ABSTRACT

Embodiments of this application provide a data transmission method, apparatus, and device. In the data transmission method, a first apparatus obtains a first link quality packet message that includes link quality information and indication information. The indication information is used to indicate that the link quality information is buffered. The first apparatus sends the first link quality packet message to a second apparatus, where the first link quality packet message is used by the second apparatus to perform network optimization based on the first link quality packet message. The data transmission method disclosed herein improves network optimization accuracy.

17 Claims, 21 Drawing Sheets

(56) References Cited

U.S. PATENT DOCUMENTS

| | | | |
|---|---|---|---|
| 2018/0279400 A1* | 9/2018 | Faccin | H04W 68/005 |
| 2019/0215731 A1* | 7/2019 | Qiao | H04W 24/06 |
| 2021/0037443 A1* | 2/2021 | Berggren | H04W 76/19 |
| 2022/0061055 A1* | 2/2022 | Freda | H04W 72/1263 |

FOREIGN PATENT DOCUMENTS

| | | |
|---|---|---|
| CN | 103716834 A | 4/2014 |
| CN | 106878036 A | 6/2017 |
| CN | 107079373 A | 8/2017 |
| CN | 107529182 A | 12/2017 |
| CN | 108174412 A | 6/2018 |
| CN | 108882293 A | 11/2018 |
| CN | 109327347 A | 2/2019 |
| CN | 109560945 A | 4/2019 |
| EP | 1698117 B1 | 4/2013 |
| EP | 1751934 B1 | 12/2017 |
| EP | 3403473 B1 | 12/2019 |
| WO | 2017219547 A1 | 12/2017 |

\* cited by examiner

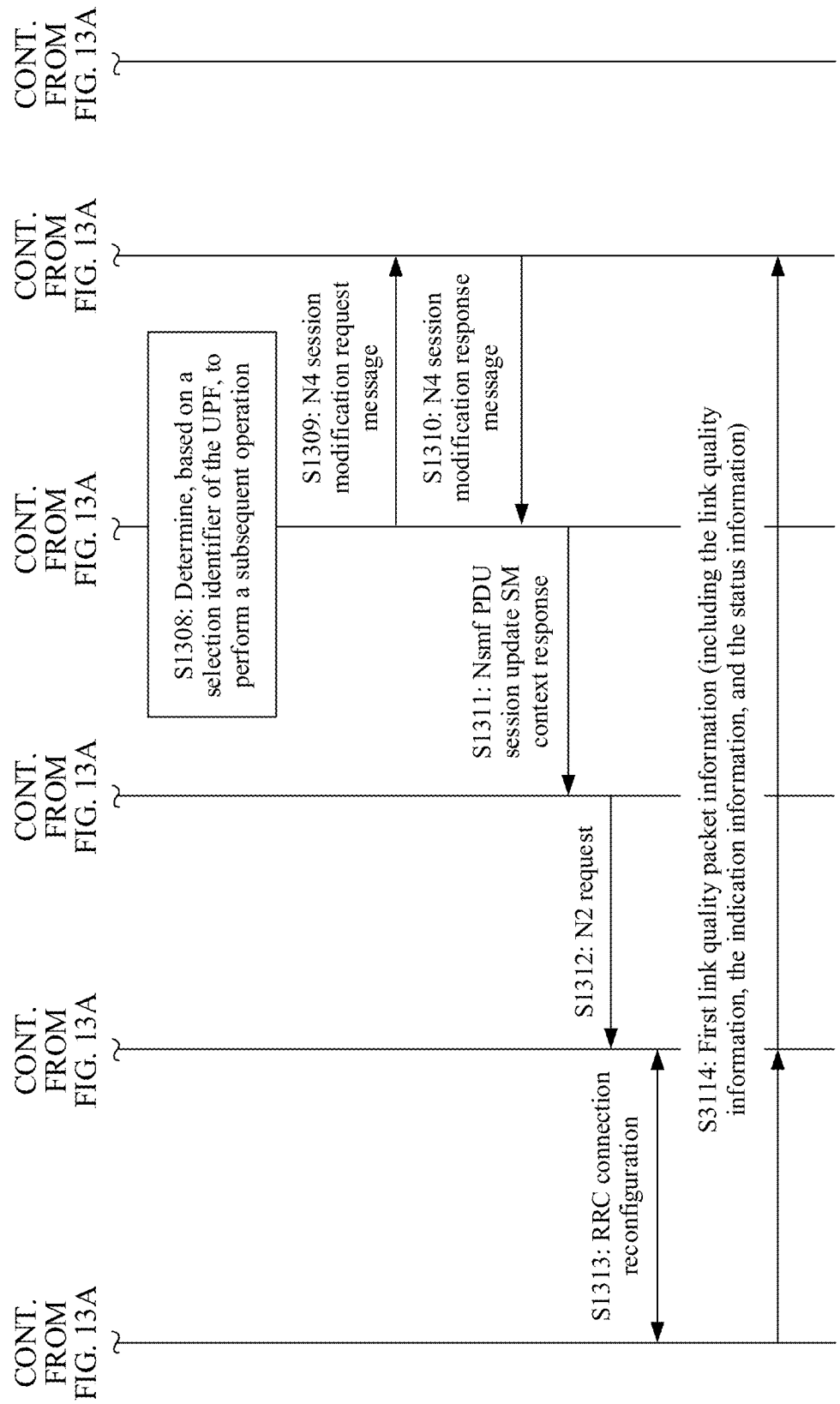

DATA TRANSMISSION METHOD, APPARATUS, AND DEVICE

CROSS-REFERENCE TO RELATED APPLICATIONS

This application is a continuation of International Application No. PCT/CN2020/097625, filed on Jun. 23, 2020, which claims priority to Chinese Patent Application No. 201910578156.0, filed on Jun. 28, 2019. The disclosures of the aforementioned applications are hereby incorporated by reference in their entireties.

TECHNICAL FIELD

In a wireless communication process, a network device is configured to obtain link quality information of a terminal device and perform network optimization based on the link quality information of the terminal device.

In an actual transmission process of link quality information, some network devices may buffer the link quality information. For example, in a terminal device handover process, link quality information sent by the terminal device may be buffered in a source base station. However, if the link quality information is buffered in a transmission process, the network device cannot accurately perform network optimization based on link quality information.

SUMMARY

This application provides a data transmission method, apparatus, and device, to improve accuracy of network optimization.

According to a first aspect, embodiments of this application provides a data transmission method. A first apparatus obtains a first link quality packet message, and sends the first link quality packet message to a second apparatus. The first link quality packet message includes link quality information and indication information, and the indication information is used to indicate that the link quality information is buffered. The first link quality packet message is used by the second apparatus to perform network optimization based on the first link quality packet message.

In the foregoing process, when the link quality information is reported to the second apparatus, if the link quality information is buffered, the indication information corresponding to the link quality information is further reported when the link quality information is reported to the second apparatus. The indication information may indicate that the link quality information is buffered. After receiving the link quality information and the corresponding indication information, the second apparatus may determine, based on the indication information, that the link quality information is buffered, and further may perform more accurate network optimization based on the link quality information. This improves accuracy of network optimization.

In a possible implementation, the first link quality packet message further includes status information. The status information is used to indicate a status of an apparatus for buffering the link quality packet when the link quality information is buffered, and the status includes one of the following states: a switching state, a paging state, or a service requesting state.

In the foregoing process, if the first link quality packet message includes the indication information and the status information, the second apparatus may determine, based on the indication information and the status information, a reason why the link quality information is buffered. In this way, the second apparatus can accurately perform network optimization.

In a possible implementation, the first apparatus is a user plane function (UPF) network element, a radio access network (RAN) node, or a session management function (SMF) network element. In this case, the first apparatus may obtain the first link quality packet message in the following feasible implementation: The first apparatus receives the first link quality packet message from a terminal apparatus.

In the foregoing process, a terminal device generates the first link quality packet message. Correspondingly, the UPF network element, the RAN node, or the SMF network element may receive the first link quality packet message from the terminal device.

In a possible implementation, the first apparatus is a terminal apparatus; and the first apparatus may obtain the first link quality packet message in the following feasible implementation: The first apparatus receives a second link quality packet message, where the second link quality packet message includes the link quality information and the indication information; and the first apparatus generates the first link quality packet message based on the second link quality packet message.

In the foregoing process, the terminal device generates the first link quality packet message based on the received second link quality packet message. When the second link quality packet message includes the indication information, the first link quality packet message generated by the terminal device also includes the indication information. In this way, whenever the link quality information is buffered, the first link quality packet message reported to the second apparatus may carry the indication information.

In a possible implementation, the second link quality packet message is generated by a third apparatus based on the link quality information and the indication information after the link quality information is buffered, and the third apparatus is a UPF network element or a RAN node.

In the foregoing process, after the third apparatus buffers the link quality information, the third apparatus generates the second link quality packet message including the indication information, so that the first link quality packet message reported to the second apparatus carries the indication information. In this way, the second apparatus may perform accurate network optimization based on the link quality information and the indication information.

In a possible implementation, the second link quality packet message further includes status information, and the first link quality information further includes the status information.

In the foregoing process, when the second link quality packet message includes the status information, the first link quality packet message also includes the status information, so that whenever the link quality information is buffered, the first link quality packet message reported to the second apparatus may carry the status information.

In a possible implementation, the second link quality packet message is generated by the third apparatus based on the link quality information, the indication information, and the status information after the link quality information is buffered, and the third apparatus is a UPF network element or a RAN node.

In the foregoing process, after the third apparatus buffers the link quality information, the third apparatus generates the second link quality packet message including the indication information and the status information, so that the first link quality packet message reported to the second apparatus carries the indication information and the status information. In this way, the second apparatus may perform accurate network optimization based on the link quality information, the indication information, and the status information.

In a possible implementation, the first apparatus is a terminal apparatus; and the first apparatus may obtain the first link quality packet message in the following feasible implementation: The first apparatus receives the link quality information; and if the first apparatus buffers the link quality information, the first apparatus generates the first link quality packet message based on the link quality information and the indication information.

In the foregoing process, after the terminal apparatus buffers the link quality information, the terminal apparatus generates the first link quality packet message including the indication information, so that the first link quality packet message reported to the second apparatus carries the indication information. In this way, the second apparatus may perform accurate network optimization based on the link quality information and the indication information.

In a possible implementation, the generating the first link quality packet message based on the link quality information and the indication information includes: The first apparatus obtains status information based on a status of the first apparatus; and the first apparatus generates the first link quality packet message based on the link quality information, the indication information, and the status information, where the first link quality packet message further includes the status information.

In the foregoing process, after the terminal apparatus buffers the link quality information, the terminal apparatus generates the first link quality packet message including the indication information and the status information, so that the first link quality packet message reported to the second apparatus carries the indication information and the status information. In this way, the second apparatus may perform accurate network optimization based on the link quality information, the indication information, and the status information.

According to a second aspect, embodiments of this application provides a data transmission method. A second apparatus receives a first link quality packet message sent by a first apparatus, where the first link quality packet message includes link quality information and indication information, and the indication information is used to indicate that the link quality information is buffered; and the second apparatus performs network optimization based on the first link quality packet message.

In the foregoing process, in a process of reporting the link quality information to the second apparatus, if the link quality information is buffered, the indication information corresponding to the link quality information is further reported when the link quality information is reported to the second apparatus. The indication information may indicate that the link quality information is buffered. After receiving the link quality information and the corresponding indication information, the second apparatus may determine, based on the indication information, that the link quality information is buffered, and further may perform more accurate network optimization based on the link quality information.

In a possible implementation, the first link quality packet message further includes status information. The status information is used to indicate a status of an apparatus for buffering the link quality packet when the link quality information is buffered, and the status information includes one of the following states: a switching state, a paging state, or a service requesting state.

In the foregoing process, if the first link quality packet message includes the indication information and the status information, the second apparatus may determine, based on the indication information and the status information, a reason why the link quality information is buffered. In this way, the second apparatus may accurately perform network optimization.

According to a third aspect, embodiments of this application provides a data transmission apparatus, where the data transmission apparatus is configured to perform the data transmission method according to any one of the first aspect.

According to a fourth aspect, embodiments of this application provides a data transmission apparatus, where the data transmission apparatus is configured to perform the data transmission method according to any one of the second aspect.

According to a fifth aspect, embodiments of this application provides a data transmission apparatus, including a memory, a processor, and a transmitter. The processor executes program instructions in the memory.

The processor is configured to obtain a first link quality packet message, where the first link quality packet message includes link quality information and indication information, and the indication information is used to indicate that the link quality information is buffered.

The transmitter is configured to send the first link quality packet message to a second apparatus, where the first link quality packet message is used by the second apparatus to perform network optimization based on the first link quality packet message.

In a possible implementation, the first link quality packet message further includes status information. The status information is used to indicate a status of an apparatus for buffering the link quality packet when the link quality information is buffered, and the status includes one of the following states: a switching state, a paging state, or a service requesting state.

In a possible implementation, the data transmission apparatus is a user plane function (UPF) network element, a radio access network (RAN) node, or a session management function (SMF) network element. The data transmission apparatus further includes a receiver.

The receiver is configured to receive the first link quality packet message from a terminal apparatus.

In a possible implementation, the data transmission apparatus is a terminal apparatus.

The receiver is further configured to receive a second link quality packet message, where the second link quality packet message includes the link quality information and the indication information.

The processor is further configured to generate the first link quality packet message based on the second link quality packet message.

In a possible implementation, the second link quality packet message is generated by a third apparatus based on the link quality information and the indication information after the link quality information is buffered, and the third apparatus is a UPF network element or a RAN node.

In a possible implementation, the second link quality packet message further includes status information, and the first link quality information further includes the status information.

In a possible implementation, the second link quality packet message is generated by the third apparatus based on the link quality information, the indication information, and the status information after the link quality information is buffered, and the third apparatus is a UPF network element or a RAN node.

In a possible implementation, the data transmission apparatus is a terminal apparatus. The processor is configured to:
obtain the link quality information; and
if the data transmission apparatus buffers the link quality information, generate the first link quality packet message based on the link quality information and the indication information.

In a possible implementation, the data transmission apparatus is a terminal apparatus. The processor is configured to:
obtain status information based on a status of the data transmission apparatus; and
generate the first link quality packet message based on the link quality information, the indication information, and the status information, where the first link quality packet message further includes the status information.

According to a sixth aspect, embodiments of this application provide a data transmission apparatus, including a memory, a processor, and a receiver. The processor executes program instructions in the memory.

The receiver is configured to receive a first link quality packet message sent by a first apparatus, where the first link quality packet message includes link quality information and indication information, and the indication information is used to indicate that the link quality information is buffered.

The processor is configured to perform network optimization based on the first link quality packet message.

In a possible implementation, the first link quality packet message further includes status information. The status information is used to indicate a status of an apparatus for buffering the link quality packet when the link quality information is buffered, and the status information includes one of the following states: a switching state, a paging state, or a service requesting state.

According to a seventh aspect, embodiments of this application provides a communication system, including a first apparatus and a second apparatus.

The first apparatus is configured to perform the data transmission method according to any one of the first aspect, and the second apparatus is configured to perform the data transmission method according to any one of the second aspect.

In a possible implementation, the system further includes a third apparatus, where the third apparatus is configured to: buffer link quality information, generate a link quality packet message after the link quality information is buffered, and send the link quality packet message to the first apparatus.

The link quality packet message includes the link quality information and indication information, or the link quality packet message includes the link quality information, the indication information, and status information.

In a possible implementation, the first apparatus is a user plane function UPF network element, a radio access network (RAN) node, a session management function (SMF) network element, or a terminal apparatus.

The second apparatus is a network data analysis (NWDA) network element.

The third apparatus is a UPF network element or a RAN node.

According to an eighth aspect, embodiments of this application provides a storage medium, where the storage medium is configured to store a computer program. When the computer program is executed by a computer or a processor, the computer program is used to implement the data transmission method according to any one of the first aspect or the data transmission method according to any one of the second aspect.

According to a ninth aspect, embodiments of this application provides a computer program product, where the computer program product includes instructions. When the instructions are executed, a computer is enabled to perform the data transmission method according to any one of the first aspect or the data transmission method according to any one of the second aspect.

According to a sixth aspect, embodiments of this application provides a system-on-a-chip or a system chip, where the system-on-a-chip or the system chip may be used in an apparatus (for example, an electronic apparatus). The system-on-a-chip or the system chip includes at least one communication interface, at least one processor, and at least one memory. The communication interface, the memory, and the processor are interconnected through a bus, and the processor executes instructions stored in the memory, so that the apparatus (for example, the electronic apparatus) can perform the data transmission method according to any one of the first aspect of this application or the data transmission method according to any one of the second aspect.

According to the data transmission method, apparatus, and device provided in the embodiments of this application, in the process of reporting the link quality information to the second apparatus, if the link quality information is buffered, the indication information corresponding to the link quality information is further reported to the second apparatus when the link quality information is reported. The indication information may indicate that the link quality information is buffered. After receiving the link quality information and the corresponding indication information, the second apparatus may determine, based on the indication information, whether the link quality information is buffered, and further may perform more accurate network optimization based on the link quality information.

BRIEF DESCRIPTION OF DRAWINGS

FIG. 13A and FIG. 13B are a schematic flowchart of a further data transmission method according to an embodiment of this application;

DESCRIPTION OF EMBODIMENTS

The technical solutions shown in this application may be applied to a 5th generation mobile communication technology (5G for short) system; or may be applied to a long term evolution (LTE) system, for example, a vehicle-to-everything (V2X) system, a device-to-device (D2D) system, or a machine type communication (MTC) system in the LTE communication system; and may be further applied to a universal mobile telecommunications system (UMTS) terrestrial radio access network (UTRAN) system, or a global system for mobile communication (GSM)/enhanced data rate for GSM evolution (EDGE) system radio access network (GSM/EDGE radio access network, GERAN) architecture. The technical solutions shown in this application may be further applied to another communication system, for example, an evolved communication system of a 5G system. This is not limited in this application.

Figure 1A:
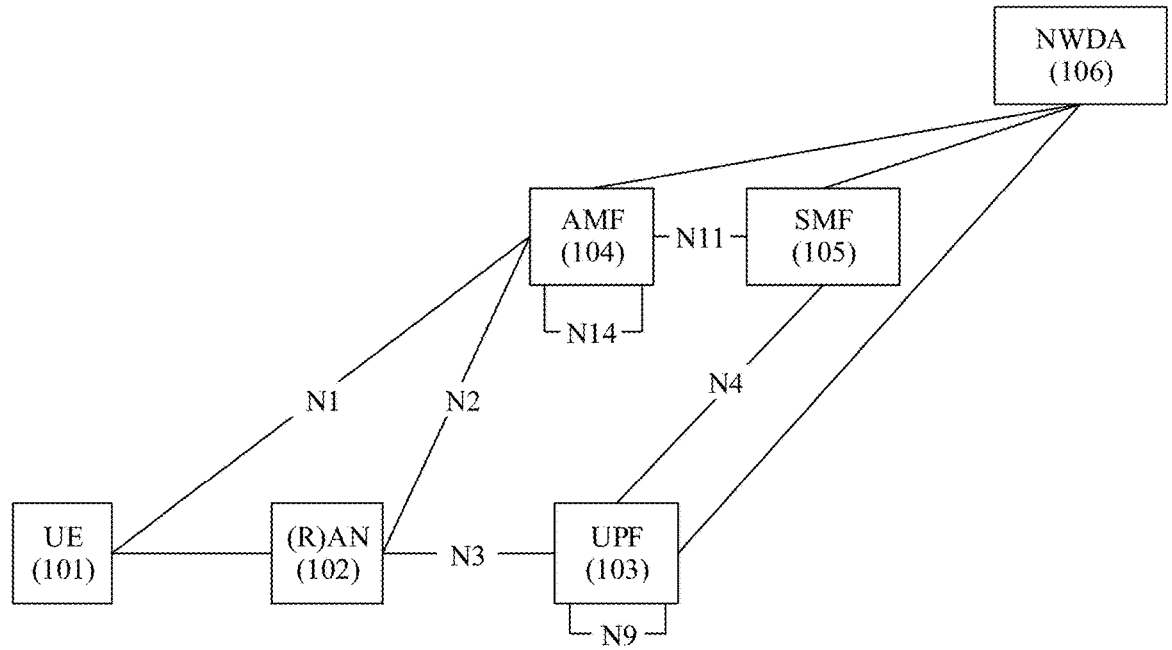
FIG. 1A is an architectural diagram of a communication system according to this application.

FIG. 1A is an architectural diagram of a communication system according to this application. Refer to FIG. 1A. The communication system may include user equipment (UE) 101, an access network (AN) node 102, a user plane function (UPF) network element 103, an access and mobility management function (AMF) network element 104, a session management function (SMF) network element 105, and a network data analysis (NWDA) network element 106.

The UE 101 may be a mobile phone (or referred to as a "cellular" phone) or a computer having a mobile terminal, for example, may be a portable, pocket-sized, handheld, computer-embedded, or vehicle-mounted mobile apparatus. In addition, the UE may also be referred to as a mobile station (MS), a terminal, or a terminal device. This is not limited in this application.

The AN node 102 may be a device that provides wireless access for the UE, including but not limited to an evolved node B (eNB for short), a wireless-fidelity access point (Wi-Fi AP for short), a worldwide interoperability for microwave access base station (WiMAX BS for short), and a base station (for example, a gNodeB or a gNB) in a 5G network. The AN node may alternatively be a radio access network (RAN) node.

The UPF network element 103 may process a packet. For example, the UPF network element 103 may perform functions such as user data forwarding, routing, data statistics, rate limiting, and statistics reporting.

The AMF instance 104 may perform mobility management in a mobile network, for example, user location update, user registration with a network, and user switching. The AMF instance may further forward messages between the SMF network element 105 and the UE 101.

The SMF network element 105 may perform a session management function. For example, the SMF network element 105 may establish a session, modify a session, and release a session. The SMF network element 105 may further manage a quality of service (QoS) flow (QoS flow), manage a UPF user plane resource, and the like.

The NWDA network element 106 may indicate a network data analysis function, and provide an analysis service for another function in a network. For example, the NWDA network element 106 may further perform network optimization based on link quality information obtained through collection, and also a service level agreement (SLA) of the UE, for example, bandwidth, jitter, and a latency.

Figure 1B:
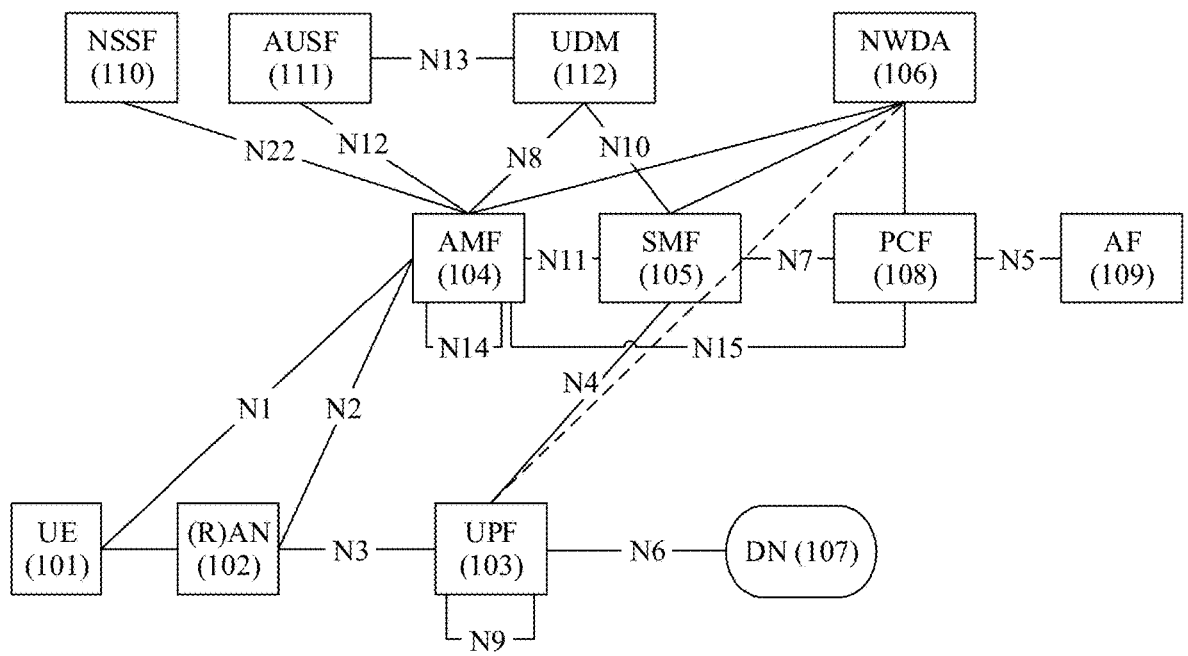
FIG. 1B is an architectural diagram of another communication system according to this application.

FIG. 1B is an architectural diagram of another communication system according to this application. Based on embodiments shown in FIG. 1A, refer to FIG. 1B. The communication system may further include a data network (DN) 107, a policy control function (PCF) network element 108, an application layer function (application function, AF) network element 109, a network slice selection function (NSSF) network element 110, an authentication server function (AUSF) network element 110, and a unified data management (UDM) network element 112.

The DN 107 is configured to provide a data service for the UE. The PCF network element 108 may formulate a policy of a terminal device, for example, a quality of service (QoS for short) policy or a slice selection policy. The AF network element 109 may send a request to influence an SMF routing policy and be responsible for selecting and relocating an application in a local DN. The NSSF network element 110 is configured to select a network slice. The AUSF network element 111 provides an authentication service function, and is configured to authenticate the terminal device. The UDM network element 112 may store information such as user subscription data.

A person skilled in the art may understand that a character on a line between network elements in embodiments in FIG. 1A and FIG. 1B identifies a communication interface between the network elements. The foregoing network elements may be network elements implemented on dedicated hardware, or may be software instances run on dedicated hardware, or may be instances of virtualization functions on a proper platform. For example, the foregoing virtualization platform may be a cloud platform.

Refer to FIG. 1A and FIG. 1B. The NWDA network element 106 may obtain link quality information between the UE 101 and the UPF network element 103 from the UPF network element 103, the AMF network element 104, and the SMF network element 105, and perform network optimization based on the obtained link quality information. For example, the link quality information may include data latency information, bandwidth, jitter, and the like.

Figure 2:
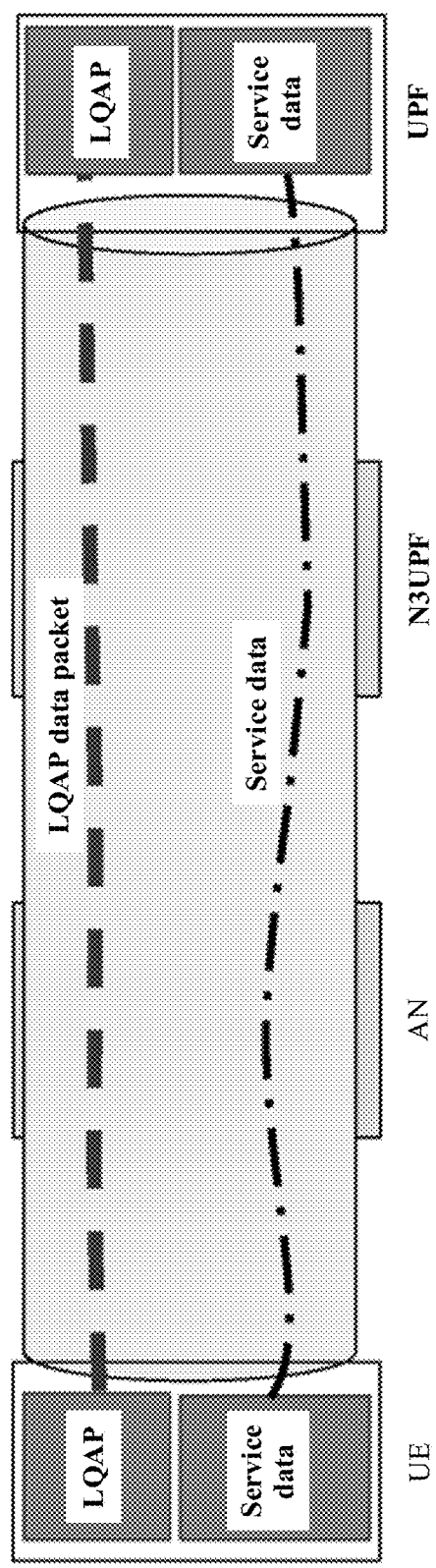
FIG. 2 is a schematic diagram of a model for obtaining link quality information according to an embodiment of this application.
Figure 3:
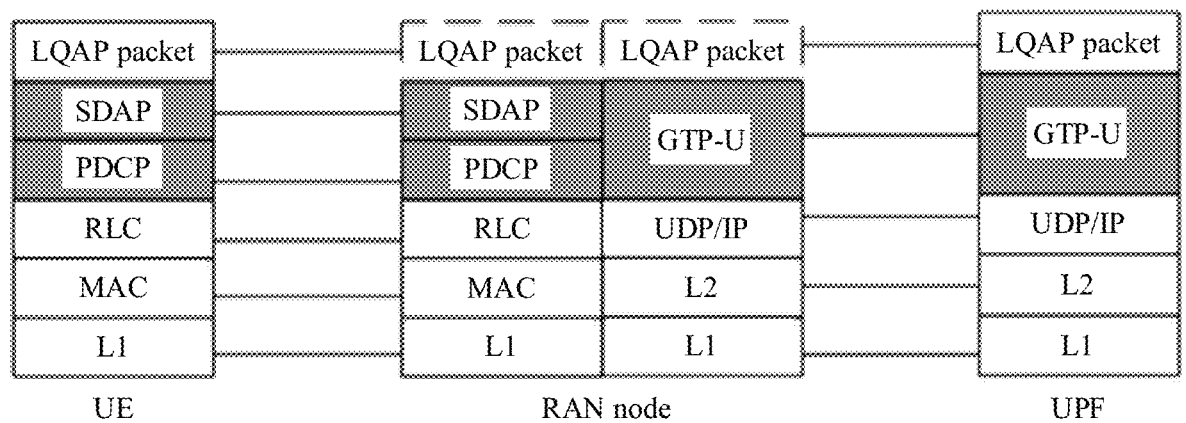
FIG. 3 is a protocol stack model of an LQAP packet according to an embodiment of this application.
Figure 4:
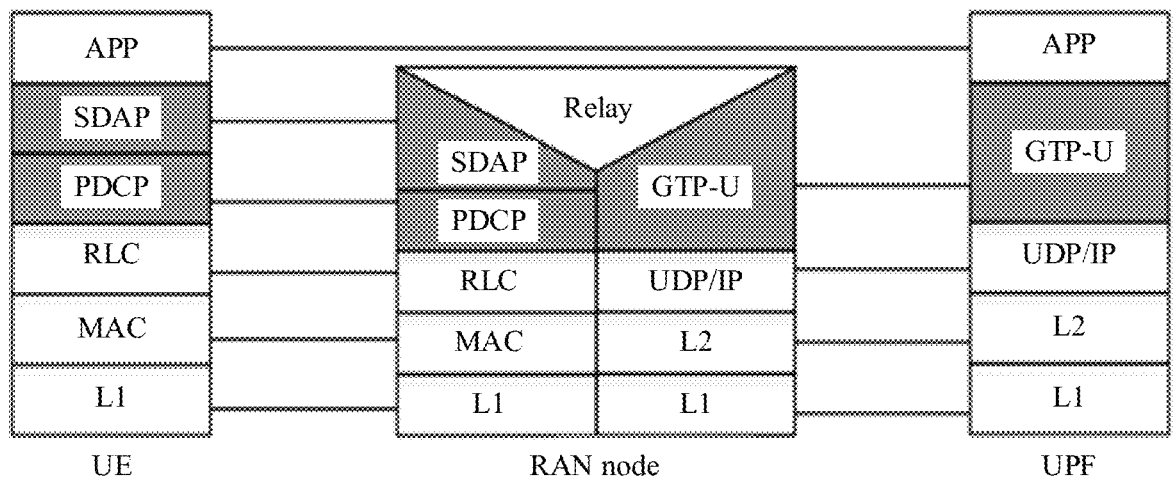
FIG. 4 is a protocol stack model of a service packet according to an embodiment of this application.

Optionally, the link quality information between the UE and the UPF network element may be obtained by using a link quality awareness protocol (LQAP) between the UE, the RAN node (optional), and the UPF network element. With reference to FIG. 2 to FIG. 4, a process of obtaining the link quality information by using the LQAP protocol is described.

FIG. 2 is a schematic diagram of a model for obtaining link quality information according to embodiments of this application. Refer to FIG. 2. The LQAP protocol establishes a detection-dedicated logical link for a service. The logical link and an LQAP protocol processing module may be used to implement service SLA real-time measurement, and monitor an end-to-end (E2E) resource used by the logical link and a related service. Therefore, an LQAP detection packet transmitted on the logical link can reflect transmission quality of the service.

FIG. 3 is a protocol stack model of an LQAP packet according to embodiments of this application. FIG. 4 is a protocol stack model of a service packet according to embodiments of this application. Refer to FIG. 3 and FIG. 4. A protocol stack of the service packet is not affected. The LQAP packet is sent and received only on a device that supports the LQAP protocol, for example, UE, a RAN node, and a UPF network element. The LQAP packet and the service packet both use 3GPP network protocol headers. This can ensure that the LQAP packet and the service packet use a same end-to-end tunnel resource. Therefore, a quality status of an E2E tunnel on which the LQAP is located can be reflected by transmission quality of the LQPA packet.

A format of the 3GPP network protocol header is shown in protocol stacks in FIG. 3 and FIG. 4. A 3GPP network protocol header from the UE to the RAN node includes three parts: a service data adaptation protocol (SDAP) header, a packet data convergence protocol (PDCP) header, and a header of a lower-layer protocol. A 3GPP network protocol header between a base station and the UPF includes a GPRS tunneling protocol-user plane (GTP-U) header, a user datagram protocol (UDP)/internet protocol (IP) header, and a header of a lower-layer protocol layer. Refer to FIG. 3 and FIG. 4. The protocol stack model of the LQAP packet and the protocol stack model of the service packet each further include a radio link layer control (RLC) protocol and a media access control (MAC) protocol.

It should be noted that the service in this application may be an ultra-reliable and low-latency communication (URLLC) service, and the URLLC service is one of three application scenarios that a 5G network should have, for example, including an application scenario that applies to vertical industries such as internet of vehicles, industrial internet, smart manufacturing, telemedicine, and emergency communication. The service requires highly reliable transmission and an extremely low latency and jitter.

Currently, link quality between the UE and the UPF network element may be measured in another manner. For example, the link quality between the UE and the UPF network element may be measured by using a bidirectional forwarding detection (BFD) technology. For example, one node may send a fixed quantity of detection packets (for example, hello detection packets) to another node within a specific time period, and a receive end determines, based on whether data packets lose consecutively within the time period, whether a fault occurs in a network. In the BFD, a device-level session is established to detect a bidirectional forwarding path between devices to serve an upper-layer application. During a session, two ends negotiate to send/receive a packet, a latency, and jitter information.

For ease of understanding, the following describes a process of reporting link quality information to an NWDA network element.

In a feasible implementation, the UPF network element sends downlink link quality information to the UE, and the UE sends uplink link quality information based on the downlink link quality information (referred to as a link quality information reporting manner 1 below).

In a process of transmitting the link quality information, the link quality information may pass through a plurality of apparatuses. For example, in a downlink process, the link quality information may sequentially pass through an SMF network element, the UPF network element, and the RAN node, and arrives at the UE. In an uplink process, the link quality information may sequentially pass through the UE, the RAN node, the UPF network element, or the SMF network element. Each time the link quality information arrives at an apparatus, the apparatus may or may not add content to the link quality information. Each time the link quality information passes through an apparatus, the apparatus may update a packet header of a packet in which the link quality information is located, for example, change a destination address of the packet in which the link quality information is located.

For example, it is assumed that the link quality information sent by the UPF network element to the UE passes through the RAN node. The link quality information sent by the UPF network element to the RAN node includes information 1. The RAN node may add information 2 to the information 1, to obtain the information 1+the information 2, and the RAN node sends the information 1+the information 2 to the UE. Certainly, the RAN node may alternatively not add content to the information 1, and the RAN node sends the information 1 to the UE.

In these feasible implementations, the link quality may be determined based on the downlink link quality information and the uplink link quality information. For example, a link latency may be determined based on a moment at which the UPF network element sends the downlink link quality information to the UE and a moment at which the UPF network element receives the uplink link quality information sent by the UE.

In this feasible implementation, the link quality information is usually buffered in the downlink process. For example, in the downlink process, both the UPF network element and the RAN node may buffer the link quality information. After an apparatus buffers the link quality information, indication information corresponding to the link quality information may be added (a process of adding the indication information is described in detail in embodiments shown in FIG. 5), and the indication information is used to indicate that the link quality information is buffered. After the indication information corresponding to the link quality information is added, in a process of transmitting the link quality information that carries the indication information, regardless of whether another apparatus buffers the link quality information, the other apparatus carries the indication information when continuing to send the link quality information that carries the indication information.

For example, it is assumed that the link quality information sent by the UPF network element to the UE passes through the RAN node, and the UPF network element buffers the link quality information. The UPF network element sends the link quality information+the indication information to the RAN node. After the RAN node receives the link quality information+the indication information, the RAN node sends the link quality information+the indication information to the UE regardless of whether the RAN node buffers the link quality information+the indication information.

Optionally, when the link quality information is not buffered, indication information indicating that the link quality information is not buffered may alternatively be added. The indication information is used to indicate that the link quality information is not buffered. In other words, the indication information is added regardless of whether the link quality information is buffered. However, the indication information added when the link quality information is buffered is different from the indication information added when the link quality information is not buffered. For example, different characters may be used to represent different indication information. For example, when the indication information is 0, it indicates that the link quality information is not buffered; and when the indication information is 1, it indicates that the link quality information is buffered. It should be noted that, for ease of description, the following uses an example in which indication information is added when the link quality information is buffered, and indication information is not added when the link quality information is not buffered.

Figure 5:
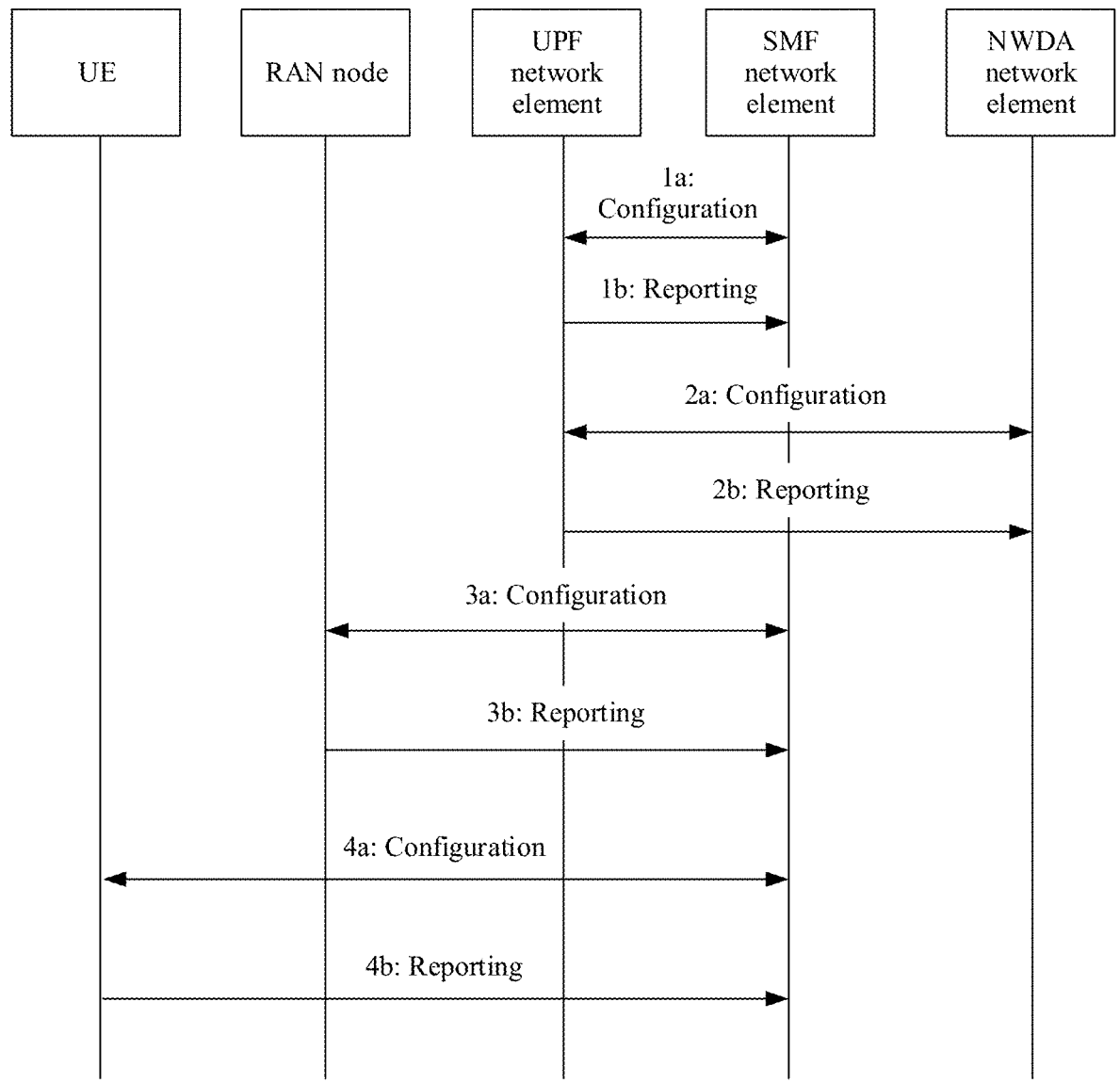
FIG. 5 is a schematic diagram of a method for configuring information carried in link quality information according to an embodiment of this application.

Optionally, if an apparatus buffers the link quality information, status information corresponding to the link quality information may be further added, where the status information is used to indicate a status of the apparatus when the link quality information is buffered (a process of adding the status information is described in detail in the embodiment shown in FIG. 5). The status may include a switching state, a paging state, a service requesting state, or the like. After the status information corresponding to the link quality information is added, in a process of transmitting the link quality information that carries the status information, if another apparatus buffers the link quality information, the another apparatus may add new status information to the link quality information. The new status information is used to indicate a status of the apparatus when the apparatus buffers the link quality information, or the another apparatus may modify the status information carried in the link quality information to the new status information.

For example, it is assumed that the link quality information sent by the UPF network element to the UE passes through the RAN node, and the UPF network element buffers the link quality information because the UPF network element performs network switching. The UPF network element sends the link quality information+the indication information+the switching state to the SMF network element. It is assumed that after the RAN node receives the link quality information+the indication information+the switching state, because a service request buffers the received link quality information+the indication information+the switching state, the RAN node may add new status information. The RAN node may send the link quality information+the indication information+the switching state+the service requesting state to the UE. Alternatively, the RAN node may modify the status information. For example, the RAN node may send the link quality information+the indication information+the service requesting state to the UE.

Optionally, when the link quality information is not buffered, the status information may also be added, and the status information is used to indicate that a network status is normal. In other words, the status information is added regardless of whether the link quality information is buffered. However, status information added when the link quality information is buffered is different from status information added when the link quality information is not buffered. For example, different characters may be used to represent different status information. For example, a character "00" indicates the switching state, a character "01" indicates the paging state, a character "10" indicates the service requesting state, and a character "11" indicates a normal state. It should be noted that, for ease of description, the following uses an example in which the status information is added when the link quality information is buffered, and the status information is not added when the link quality information is not buffered for description.

In embodiments of this application, that the link quality information is buffered means that after the link quality information is generated or received, the link quality information is stored for a period of time before the link quality information is sent, and duration of the period of time is greater than or equal to preset duration. An apparatus (for example, the RAN node or the UPF network element) usually buffers the link quality information in a network switching process, a paging process, or a service request process.

In another feasible implementation, the UE actively sends the uplink link quality information (referred to as a link quality information reporting manner 2 below).

In this feasible implementation, the UE obtains the link quality information, and sends the uplink link quality information. After the UE obtains the link quality information, the UE may buffer the link quality information, and then send the link quality information. That is, in this feasible implementation, the UE may buffer the link quality information.

Optionally, a control apparatus may set a rule for information (the indication information or the status information) carried in the link quality information, and notify the UPF network element, the RAN node, and the UE of the rule. For example, the control apparatus may set the rule to: after buffering the link quality information, adding the indication information to the link quality information, or adding the indication information and the status information to the link quality information. Optionally, the control apparatus may be the NWDA network element or the SMF network element.

With reference to FIG. 5, the following describes a process in which the control apparatus configures the information carried in the link quality information. FIG. 5 is a schematic diagram of a method for configuring information carried in link quality information according to embodiments of this application.

Refer to 1a. A control apparatus is an SMF network element, and the SMF network element may preset a rule and send the rule to a UPF network element in a packet forwarding control protocol (PFCP) session modification procedure (PFCP session modification procedure). For example, the SMF network element may send the rule to the UPF network element by using a signaling message of an N4 interface between the SMF network element and the UPF network element. For example, the SMF network element may send the rule to the UPF network element by using a usage reporting rule (URR).

Refer to 1b. After the UPF network element receives the rule sent by the SMF network element, if the UPF network element buffers link quality information, according to the rule, the UPF network element adds indication information to the link quality information when sending the link quality information, or adds indication information and status information to the link quality information. Optionally, the UPF network element may report the link quality information to the SMF network element in a PFCP session report (PFCP session report request/response) procedure. For example, the UPF network element may report the link quality information to the SMF network element by using the signaling message of the N4 interface between the UPF network element and the SMF network. The link quality information reported by the UPF network element to the SMF network element may include the indication information, or include the indication information and the status information.

Refer to 2a. The control apparatus is an NWDA network element, and the NWDA network element may preset a rule and send the rule to the UPF network element by using a UPF service subscription message. The NWDA network element may further subscribe to reporting of link quality information of the UPF network element by using the UPF service subscription message.

Refer to 2b. After the UPF network element receives the rule sent by the NWDA network element, if the UPF network element buffers link quality information, according to the rule, the UPF network element adds indication information to the link quality information when sending the link quality information, or adds indication information and status information to the link quality information. Optionally, the UPF network element may report the link quality information to the NWDA network element by using a UPF service notification message. The link quality information reported by the UPF network element to the NWDA network element may include the indication information, or include the indication information and the status information.

Refer to 3a. The control apparatus is the SMF network element, and the SMF network element may preset a rule and send the rule to a RAN node in an N2 session management procedure. For example, The SMF network element may send the rule to the RAN node by using an N2 interface between the SMF network element and the RAN node. Optionally, the rule sent to the UPF network element in 1a may be carried in a packet to the RAN node, that is, the RAN node may receive the rule sent by the SMF network element to the UPF network element. For example, the rule sent by the SMF network element to the UPF network element in 1a may be carried in an LQAP packet, and the LQAP packet may be sent to the RAN node.

Refer to 3b. After the RAN node receives the rule, if the RAN node buffers link quality information, according to the rule, the RAN node adds indication information to the link quality information when sending the link quality information, or adds indication information and status information to the link quality information.

Refer to 4a. The control apparatus is the SMF network element, and the SMF network element may preset a rule and send the rule to UE in an N1 session management procedure. For example, the SMF network element may send the rule to the UE by using an N1 interface between the SMF network element and the UE. Optionally, the rule sent to the UPF network element in 1a may be carried in a packet to the UE, that is, the UE may receive the rule sent by the SMF network element to the UPF network element. For example, the rule sent by the SMF network element to the UPF network element in 1a may be carried in an LQAP packet, and the LQAP packet may be sent to the UE.

Refer to 4b. After the UE receives the rule, if the UE buffers link quality information, according to the rule, the UE adds indication information to the link quality information when sending the link quality information, or adds indication information and status information to the link quality information.

In this application, in a process of reporting the link quality information to the NWDA network element, if the link quality information is buffered, the indication information corresponding to the link quality information is further reported when the link quality information is reported to the NWDA network element. The indication information may indicate that the link quality information is buffered. After receiving the link quality information and the corresponding indication information, the NWDA network element may determine, based on the indication information, that the link quality information is buffered, and further may perform more accurate network optimization based on the link quality information.

Embodiments are used below to describe the technical solutions of this application. It should be noted that the following several embodiments may be combined with each other, and same or similar content is not described repeatedly in different embodiments.

Figure 6:
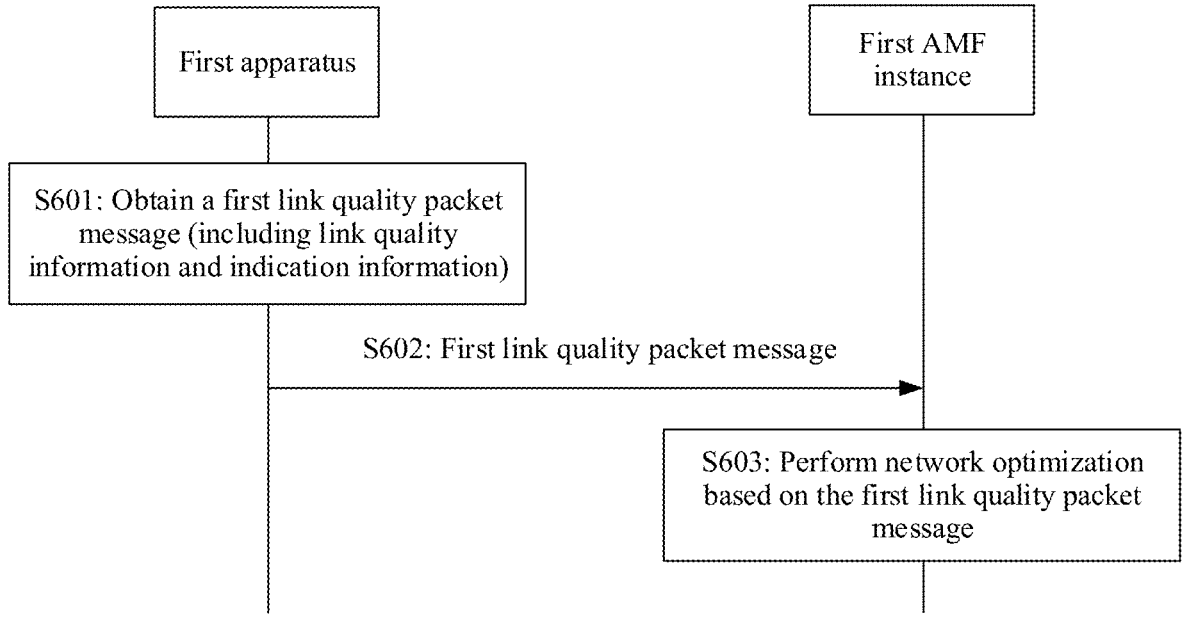
FIG. 6 is a schematic flowchart of a data transmission method according to an embodiment of this application.

FIG. 6 is a schematic flowchart of a data transmission method according to embodiments of this application. Refer to FIG. 6. The method may include the following steps.

S601: A first apparatus obtains a first link quality packet message, where the first link quality packet message includes link quality information and indication information, and the indication information is used to indicate that the link quality information is buffered.

Optionally, the first apparatus may be a UPF network element, a RAN node, an SMF network element, or a terminal apparatus (for example, UE).

Figure 7A:
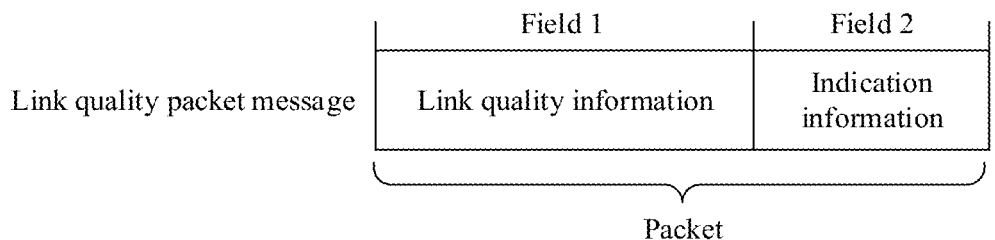
FIG. 7A is a schematic diagram of a link quality packet message according to an embodiment of this application.
Figure 7B:
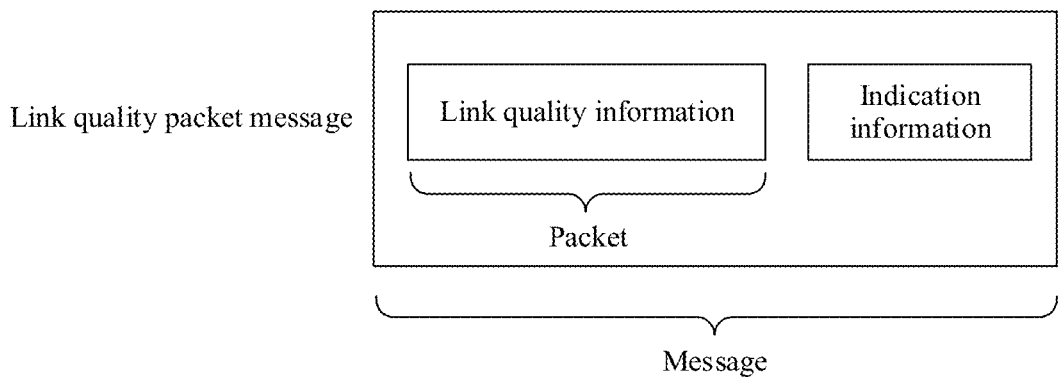
FIG. 7B is a schematic diagram of a link quality packet message according to an embodiment of this application.

With reference to FIG. 7A and FIG. 7B, the following describes a relationship between a link quality packet message (for example, the first link quality packet message and second link quality information), the link quality information, and the indication information.

FIG. 7A is a schematic diagram of a link quality packet message according to embodiments of this application. Refer to FIG. 7A. The link quality packet message is a packet, and the link quality information and the indication information are some fields in the link quality packet.

FIG. 7B is a schematic diagram of a link quality packet message according to embodiments of this application. Refer to FIG. 7B. The link quality packet message is a message. The link quality information is a packet, and the link quality information and the indication information are two parts in the link quality packet message. For example, the link quality information and the indication information may be encapsulated into a message (a link quality packet message).

Optionally, first link quality information further includes status information. The status information is used to indicate a status of an apparatus for buffering a link quality packet when the link quality information is buffered, and the status includes one of the following states: a switching state, a paging state, or a service requesting state.

Figure 7C:
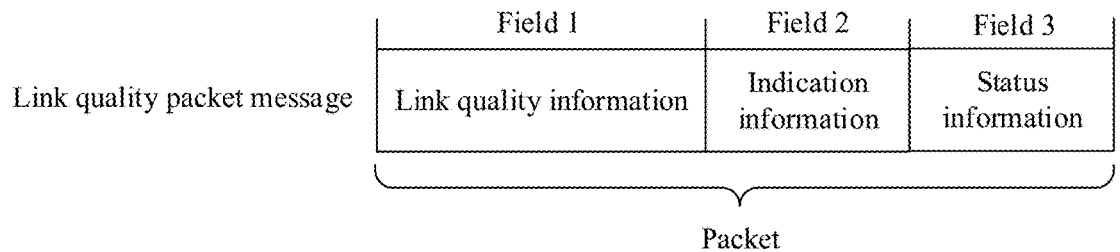
FIG. 7C is a schematic diagram of a link quality packet message according to an embodiment of this application.
Figure 7D:
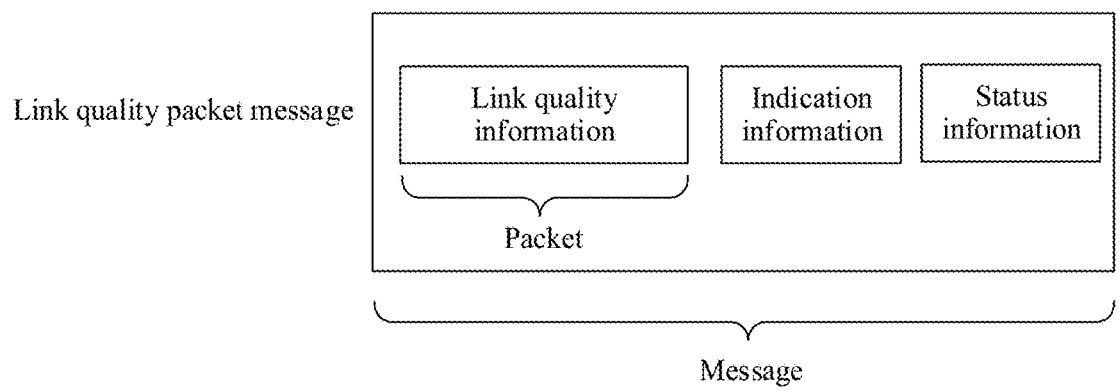
FIG. 7D is a schematic diagram of a link quality packet message according to an embodiment of this application.

With reference to FIG. 7C and FIG. 7D, the following describes a relationship between the link quality packet message (for example, the first link quality packet message and the second link quality information), the link quality information, the indication information, and the status information.

FIG. 7C is a schematic diagram of a link quality packet message according to embodiments of this application. Refer to FIG. 7C. The link quality packet message is a packet, and the link quality information, the indication information, and the status information are separately some fields in the link quality packet.

FIG. 7D is a schematic diagram of a link quality packet message according to embodiments of this application. Refer to FIG. 7D. The link quality packet message is a message. The link quality information is a packet, and the link quality information, the indication information, and the status information are separately three parts in the link quality packet message. For example, the link quality information, the indication information, and the status information may be encapsulated into a message (a link quality packet message).

When a manner of reporting the link quality information to an NWDA network element (referred to as a link quality information reporting manner below for short) is different, a process in which the first apparatus obtains the first link quality packet message is different, and may include the following plurality of possible feasible implementations.

In a feasible implementation, the link quality information reporting manner is a link quality information reporting manner 1.

When the link quality information reporting manner is the link quality information reporting manner 1, in a downlink process, a third apparatus (a UPF network element and a RAN node) may buffer the link quality information. After buffering downlink link quality information, the third apparatus may add the indication information to a packet in which the link quality information is located to obtain a second link quality packet message (a structure is shown in FIG. 7A), or encapsulate the link quality information and the indication information into a second link quality packet message (a structure is shown in FIG. 7B). Optionally, the third apparatus may further add the status information to the packet in which the link quality information is located to obtain a second link quality packet message (a structure shown in FIG. 7C), or may encapsulate the link quality information, the indication information, and the status information into a second link quality packet message (a structure shown in FIG. 7D).

After the UE receives the second link quality packet message, the UE may generate the first link quality packet message based on the second link quality packet message. When the second link quality packet message includes the indication information, the first link quality packet message also includes the indication information. When the second link quality packet message does not include the indication information, the first link quality packet message also does not include the indication information. When the second link quality packet message includes the status information, the first link quality packet message also includes the status information. When the second link quality packet message does not include the status information, the first link quality packet message also does not include the status information. When the UE does not add content to the link quality information in the second link quality packet message, the link quality information in the first link quality packet message is the same as the link quality information in the second link quality packet message. When the UE adds the content to the link quality information in the second link quality packet, the link quality information in the first link quality packet message includes the link quality information in the second link quality packet message. In other words, when the first apparatus is the UE, a manner in which the first apparatus obtains the first link quality packet message is: generating the first link quality packet message based on the received second link quality packet message.

After the UE generates the first link quality packet message, the UE reports the first link quality packet message. For example, the UE may send the first link quality packet message to the RAN node. The RAN node may send the first link quality packet message to an AMF network element, an SMF network element, or the UPF network element. The RAN node sends the first link quality packet message to the SMF network element by using the AMF network element. In other words, when the first apparatus is the RAN node, the SMF network element, or the UPF network element, a manner in which the first apparatus obtains the first link quality packet message is: receiving the first link quality packet message from the UE.

In a feasible implementation, a link quality reporting manner is a link quality reporting manner 2.

When the link quality information reporting manner is the link quality information reporting manner 2, in an uplink process, after the UE obtains the link quality information, the UE may buffer the link quality information. If the UE buffers the link quality information, the UE may add the indication information to a packet in which the link quality information is located to obtain the first link quality packet message (a structure is shown in FIG. 7A), or encapsulate the link quality information and the indication information into the first link quality packet message (a structure is shown in FIG. 7B). Optionally, the UE may further add the status information to the packet in which the link quality information is located to obtain the first link quality packet message (a structure shown in FIG. 7C), or may encapsulate the link quality information, the indication information, and the status information into the first link quality packet message (a structure shown in FIG. 7D). In other words, when the first apparatus is the UE, a manner in which the first apparatus obtains the first link quality packet message is that: the UE generates the first link quality packet message based on the obtained link quality information.

After the UE generates the first link quality packet message, the UE reports the first link quality packet message. For example, the UE may send the first link quality packet message to the RAN node. The RAN node may send the first link quality packet message to the AMF network element, the SMF network element, or the UPF network element. The RAN node sends the first link quality packet message to the SMF network element by using the AMF network element. In other words, when the first apparatus is the RAN node, the SMF network element, or the UPF network element, a manner in which the first apparatus obtains the first link quality packet message is: receiving the first link quality packet message from the UE.

S602: The first apparatus sends the first link quality packet message to a second apparatus.

Optionally, the second apparatus may be an NWDA network element.

Optionally, the first apparatus may directly send the first link quality packet message to the second apparatus. For example, when the first apparatus is the SMF network element or the UPF network element, the first apparatus may directly send the first link quality packet message to the second apparatus.

Optionally, the first apparatus may send the first link quality packet message to the second apparatus by using another apparatus. For example, when the first apparatus is the UE, the UE may send the first link quality packet message to the second apparatus by using the RAN node and the UPF network element; and when the first apparatus is the RAN node, the RAN node may send the first link quality packet message to the second apparatus by using the UPF network element.

S603: The second apparatus performs network optimization based on the first link quality packet message.

Optionally, after the second apparatus obtains the first link quality packet message, the second apparatus may generate an analysis result based on the first link quality packet message, where the analysis result is used to indicate whether an excessively long latency exists and a cause for the excessively long latency. For example, the cause for the excessively long latency may include network switching, paging, service request, and the like.

For example, after the second apparatus obtains the first link quality packet message, the second apparatus may obtain a latency based on the first link quality packet message, and determine whether the latency is greater than a preset value. If the latency is greater than the preset value, the second apparatus may determine whether the first link quality packet message includes the indication information. If the indication information is included, it indicates that the latency may be caused by buffering. If the first link quality packet message includes the status information, a cause for buffering (a latency) may be determined based on the status information. For example, if the status information included in the first link quality packet message is a switching state, it is determined that the cause for a latency process is the network switching; if the status information included in the first link quality packet message is a paging state, it is determined that the cause for the latency process is the paging; and if the status information included in the first link quality packet message is a service requesting state, it is determined that the cause for the latency process is the service request.

Optionally, after the second apparatus determines the obtained analysis result, the second apparatus may perform network optimization based on the analysis result. When analysis results are different, processes of performing network optimization by the second apparatus are also different. The following separately describes processes of performing network optimization under the different analysis results.

When the analysis result indicates that the cause for the excessively long latency is network switching, the second apparatus indicates the AMF network element to perform switching optimization, to reduce a switching process. For example, the second apparatus may indicate the AMF network element to allocate a new registration area to the UE (a physical range of the new registration area is larger than that of an old registration area). Alternatively, the second apparatus may indicate the RAN node to switch from a small cell to a macro base station, that is, the RAN node may provide a service for UE in a larger physical range.

Figure 8A:
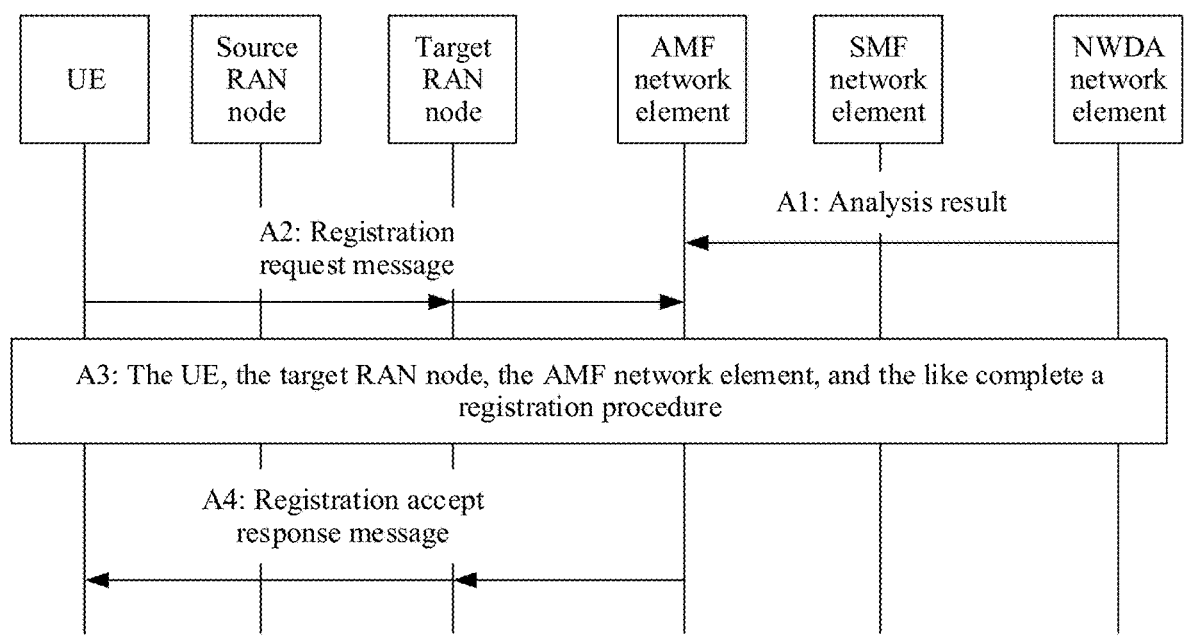
FIG. 8A is a schematic flowchart of a switching optimization method according to an embodiment of this application.
Figure 8B:
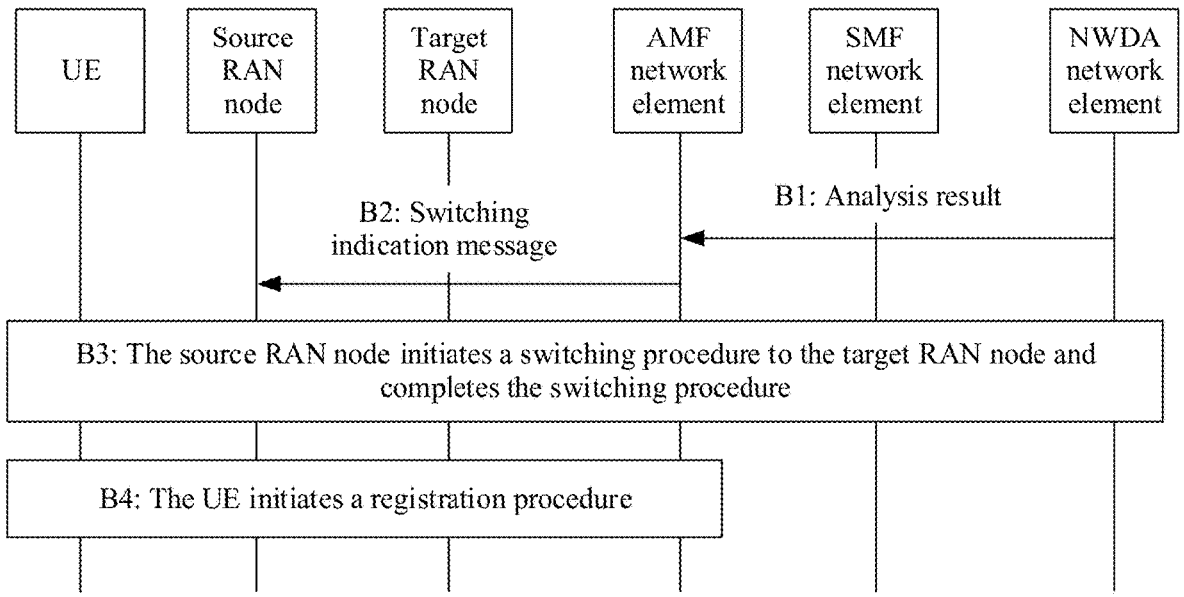
FIG. 8B is a schematic flowchart of another switching optimization method according to an embodiment of this application.

With reference to FIG. 8A and FIG. 8B, the following describes a network optimization process by using an example in which the second apparatus is the NWDA network element.

FIG. 8A is a schematic flowchart of a switching optimization method according to embodiments of this application. Refer to FIG. 8A. Switching optimization may be implemented by using steps A1 to A4.

A1: An NWDA network element sends an analysis result to an AMF network element. The analysis result indicates the AMF network element to allocate a new registration area to UE, where a physical range of a new registration area is greater than that of an old registration area.

A2: The UE sends a registration request message to the AMF network element by using a target RAN node.

A3: The UE, the target RAN node, the AMF network element, and the like complete a registration procedure.

A4: The AMF network element sends a registration accept response message to the UE, where the registration accept response message carries an identifier of the new registration area.

Through steps A1 to A4, a new registration area with a larger physical range may be allocated to the UE, to reduce a quantity of switching times.

FIG. 8B is a schematic flowchart of another switching optimization method according to embodiments of this application. Refer to FIG. 8B. Switching optimization may be implemented by using steps B1 to B4.

B1: An NWDA network element sends an analysis result to an AMF network element. The analysis result indicates that a RAN node serving UE is to be switched from a small cell to a macro base station. It is assumed that a source RAN node is a small station.

B2: The AMF network element sends a switching indication message to the source RAN node, to indicate to switch the UE served by the source RAN node to a macro base station with a larger service range.

B3: The source RAN node initiates a switching procedure to a target RAN node and completes the switching procedure. The source RAN node may first select a target RAN node with a large service range (for example, the target RAN is a macro base station with a large service range), and initiates the switching procedure to the target RAN node.

B4: The UE initiates a registration procedure.

Through steps B1 to B4, the UE may be switched to a target RAN node with a larger service range, to reduce a quantity of switching times.

When the analysis result indicates that the cause for the excessively long latency is paging, the second apparatus indicates the AMF network element to perform paging optimization, to reduce a paging process. For example, the second apparatus may indicate the AMF network element to control the UE to remain online, and at the same time indicate the RAN node to enter an inactive state, to reduce the paging process.

Figure 8C:
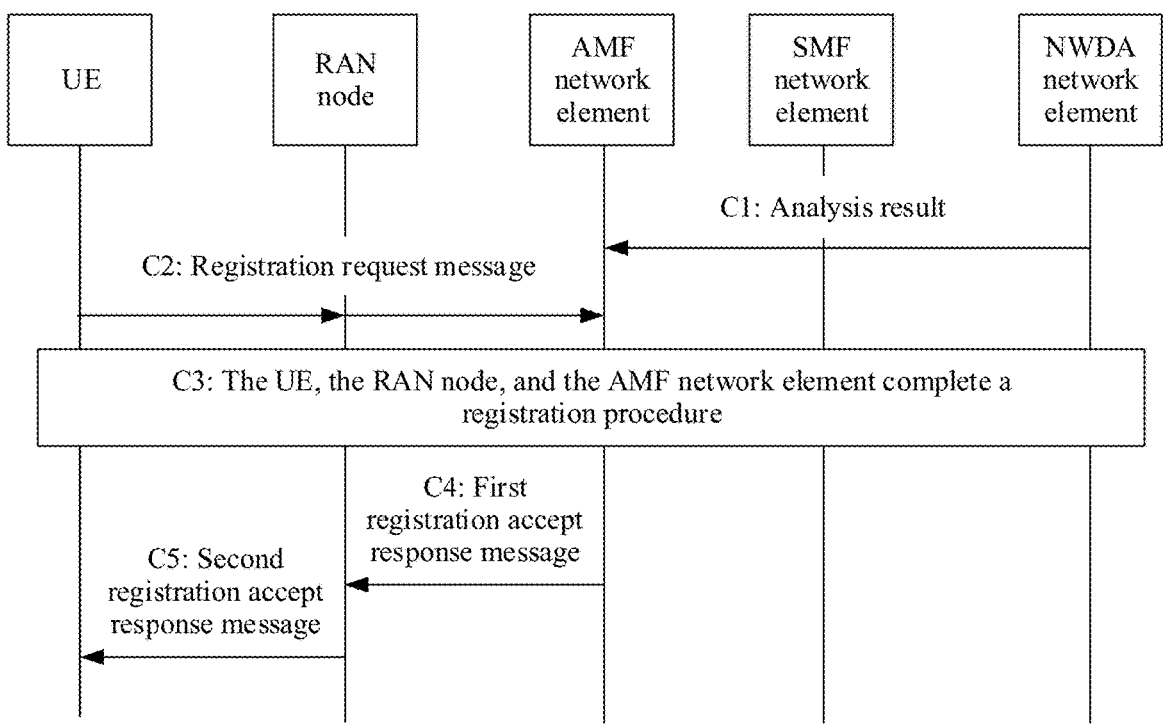
FIG. 8C is a schematic flowchart of a paging optimization method according to an embodiment of this application.

With reference to FIG. 8C, the following describes a paging optimization process by using an example in which the second apparatus is the NWDA network element.

FIG. 8C is a schematic flowchart of a paging optimization method according to embodiments of this application. Refer to FIG. 8C. Paging optimization may be implemented by using steps C1 to C4.

C1: An NWDA network element sends an analysis result to an AMF network element. The analysis result indicates the AMF network element to control UE to remain online, and enables a RAN node to enter an inactive state.

C2: The UE sends a registration request message to the AMF network element by using the RAN node.

C3: The UE, the RAN node, and the AMF network element complete a registration procedure.

C4: The AMF network element sends a first registration accept response message to the RAN node, where the first registration accept response message includes indication information for indicating the UE to remain online and indication information for indicating the RAN node to enter the inactive state.

C5: The RAN node sends a second registration accept response message to the UE, where the second registration accept message includes the indication information for indicating the UE to remain online.

Through steps C1 to C5, the UE may be enabled to remain online, so that the RAN node enters the inactive state, to reduce a quantity of paging times.

According to the data transmission method provided in embodiments of this application, in a process of reporting the link quality information to the second apparatus, if the link quality information is buffered, indication information corresponding to the link quality information is further reported to the second apparatus when the link quality information is reported. The indication information may indicate that the link quality information is buffered. After receiving the link quality information and the corresponding indication information, the second apparatus may determine, based on the indication information, that the link quality information is buffered, and further may perform more accurate network optimization based on the link quality information.

Based on any one of the foregoing embodiments, the following describes a data transmission method with reference to a specific scenario. In the following embodiment, an example in which a rule indicates to add indication information and status information to buffered link quality information is used for description.

Figure 9A:
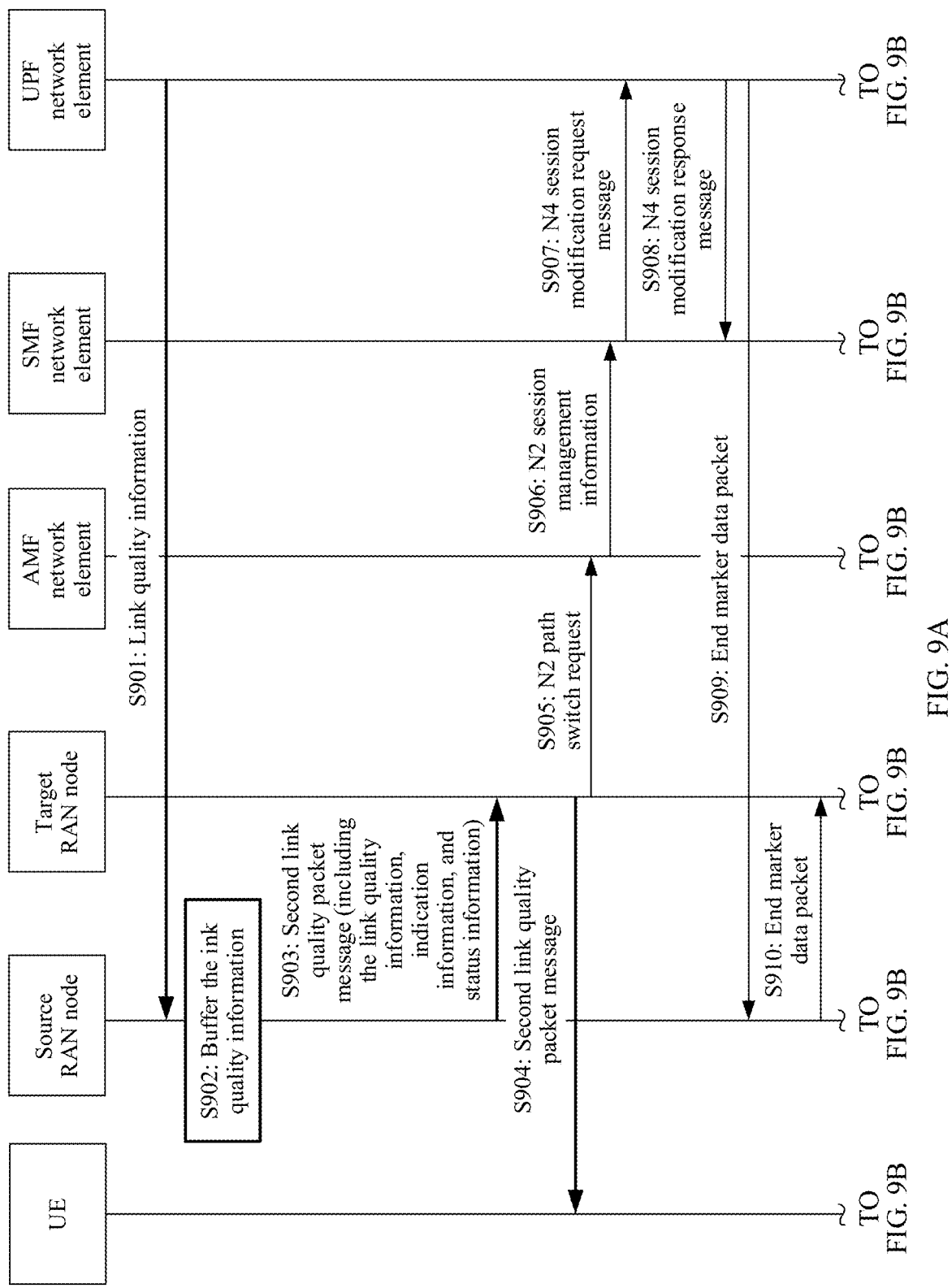
FIG. 9A and FIG. 9B are a schematic flowchart of another data transmission method according to an embodiment of this application.
Figure 9B:
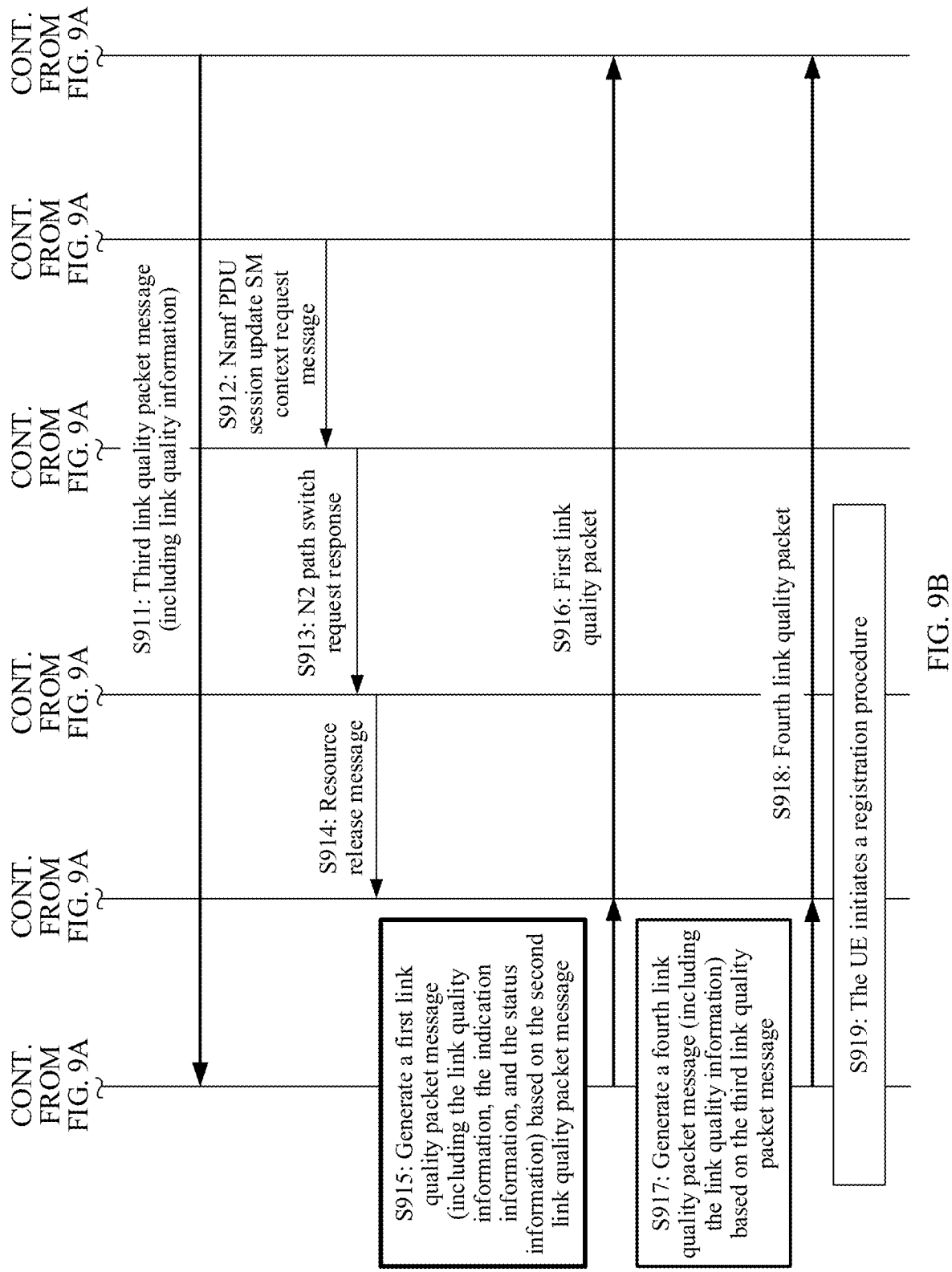
Figure 10A:
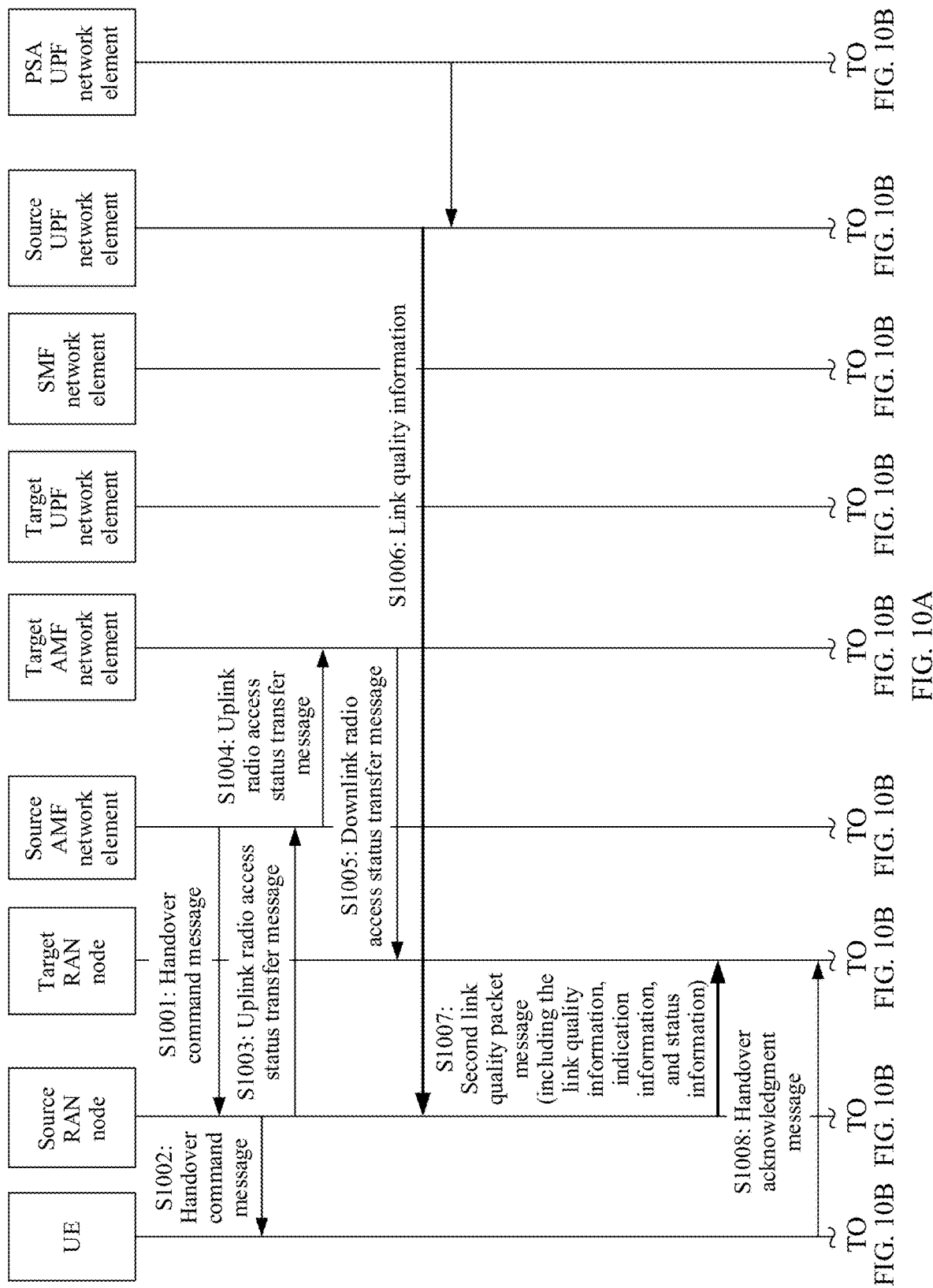
FIG. 10A to FIG. 10D are a schematic flowchart of still another data transmission method according to an embodiment of this application.
Figure 10B:
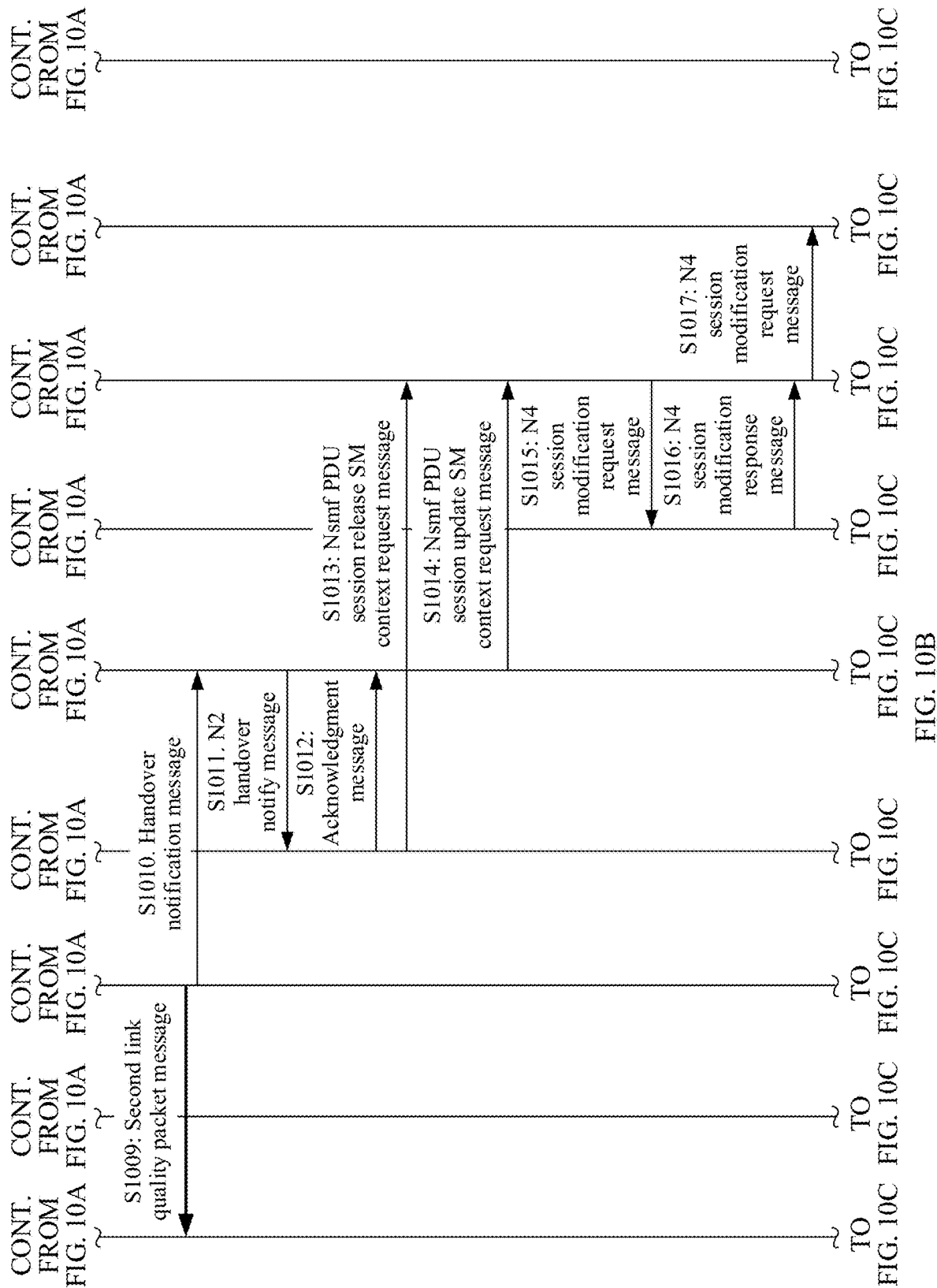
Figure 10C:
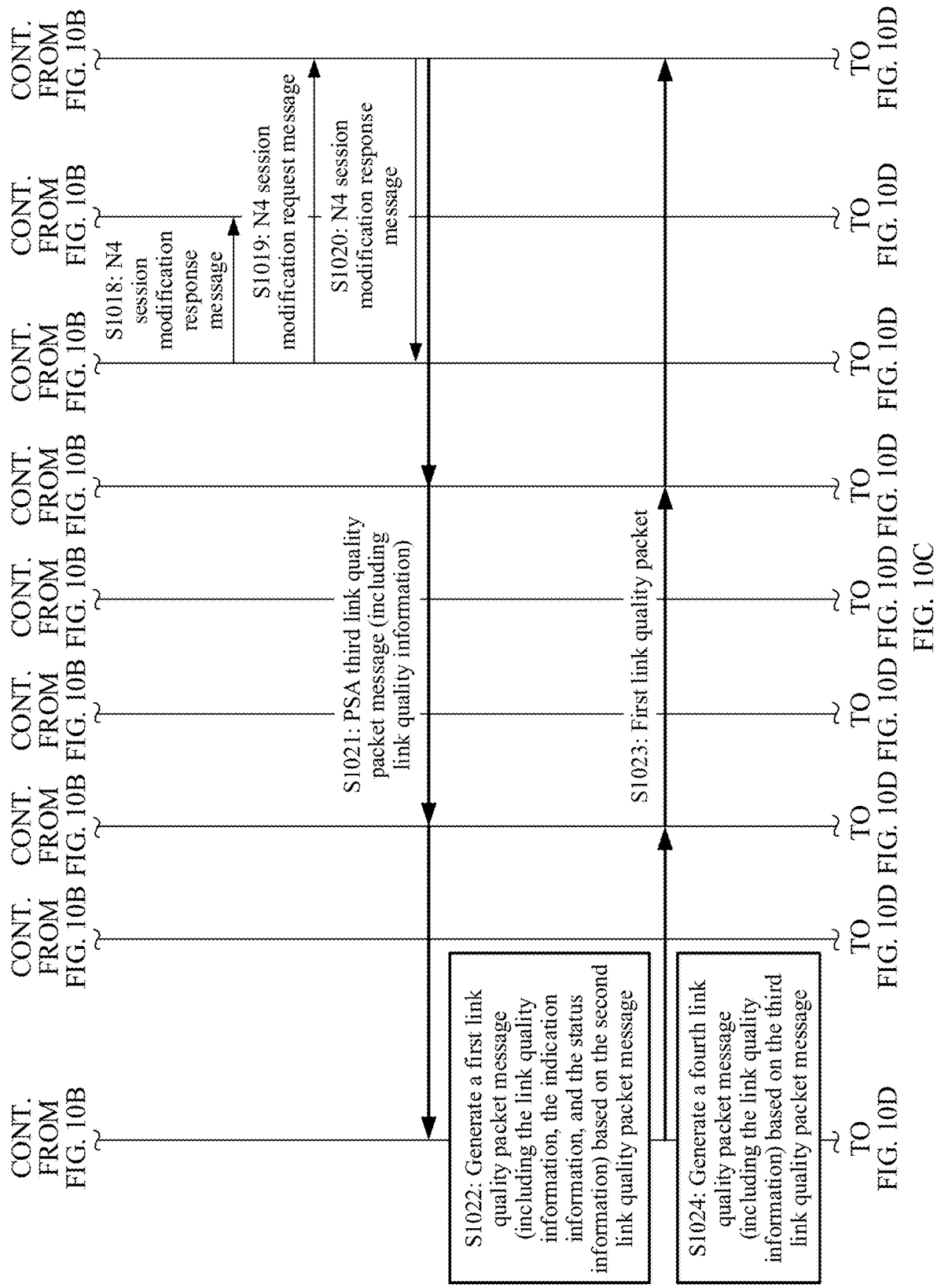
Figure 10D:
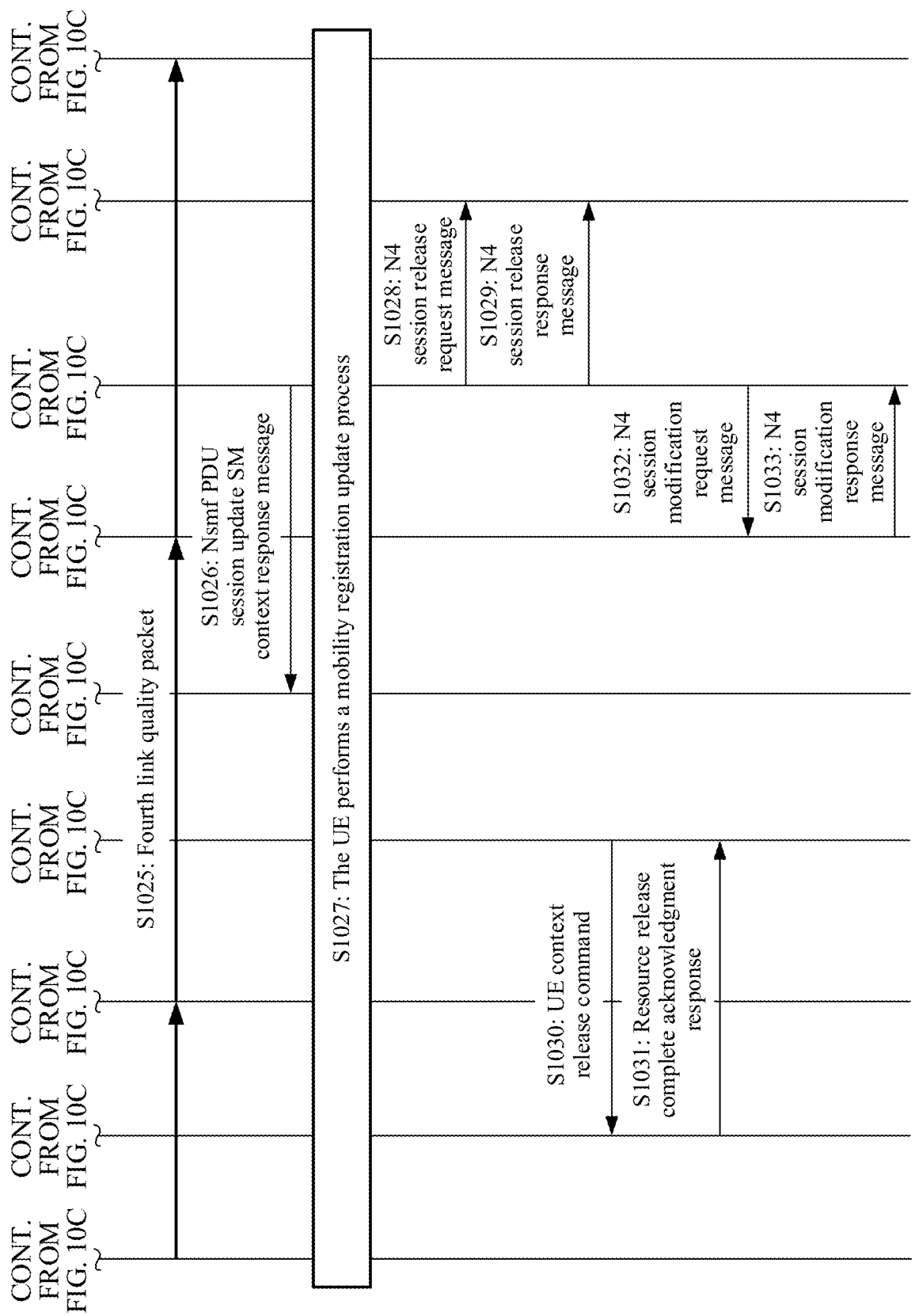

FIG. 9A and FIG. 9B are a schematic flowchart of another data transmission method according to embodiments of this application. An application scenario shown in FIG. 9A and FIG. 9B is a network switching scenario. UE is switched from a source RAN node to a target RAN node, and a link quality information reporting manner is the link quality information reporting manner 1. Refer to FIG. 9A and FIG. 9B. The method may include the following steps.

S901: A UPF network element sends link quality information to the source RAN node.

Optionally, the UPF network element may send a link quality packet to the RAN node, where the link quality packet includes the link quality information. The link quality packet further includes other information. For example, the link quality packet information may further include a packet header, for example, a destination address and a source address.

S902: The source RAN node buffers the link quality information.

Optionally, because the UE is performing network switching, the source RAN node may be disconnected from the UE. Therefore, the source RAN node buffers the link quality information.

S903: The source RAN node sends a second link quality packet message to the target RAN node, where the second link quality packet message includes the link quality information, indication information, and status information.

The status information is used to indicate a switching state.

For example, a character corresponding to the status information may be set, and the character is used to indicate the switching state. For example, a character "00" indicates the switching state, a character "01" indicates a paging state, a character "10" indicates a service requesting state, and a character "11" indicates a normal state.

S904: The target RAN node sends the second link quality packet message to the UE.

Optionally, after a radio channel of the target RAN node is established, the target RAN node sends the second link quality packet message to the UE.

It should be noted that the target RAN node may add content to the link quality information in the second link quality packet message.

S905: The target RAN node sends an N2 path switch request to an AMF network element.

The N2 path switch request is used to notify the AMF network element that the UE has moved to a new target cell, and provide the AMF network element with a to-be-switched PDU session list.

S906: The AMF network element sends N2 session management (SM) information to an SMF network element.

Optionally, after receiving the PDU session list in the N2 path switch request, the AMF network element may invoke an Nsmf_PDUSession_UpdateSMContext request service operation in each PDU session, to send the N2 SM information to the SMF.

S907: The SMF network element sends an N4 session modification request message to the UPF network element.

Optionally, for a PDU session modified by the target RAN node, the SMF network element sends the N4 session modification request message to the UPF network element.

Optionally, the SMF network element may initiate a data notification to the UPF network element to discard downlink data of the PDU session, and provide no further data notification message.

S908: For a switched PDU session, the UPF network element sends an N4 session modification response message to the SMF network element.

Optionally, for the switched PDU session, after a requested PDU session is switched, the UPF network element sends the N4 session modification response message to the SMF network element. When the UPF network element allocates core network tunnel information and is to allocate different core network tunnel information, a tunnel identifier of uplink traffic includes a PDU session whose user plane resource is not released.

S909: The UPF network element sends an end marker data packet to the source RAN node.

To assist a reordering function in the target RAN node, after path switching, the UPF network element sends one or more end marker data packets to each N3 tunnel on an old path.

S910: The source RAN node sends the end marker data packet to the target RAN node.

S911: The UPF network element sends a third link quality packet message to the UE by using the target RAN node, where the third link quality packet message includes link quality information.

Because neither the UPF network element nor the RAN node buffers the link quality information, the third link quality packet message does not include the indication information and the status information.

It should be noted that the link quality information included in the third link quality packet message may be different from the link quality information included in the second link quality packet message.

S912: The SMF network element sends an Nsmf PDU session update SM context request (Nsmf_PDUSession_UpdateSMContext Response) message to the AMF.

Optionally, core network tunnel information sent by the UPF to the AMF is used to set an N3 tunnel.

Optionally, for a PDU session that has been successfully switched, the SMF network element sends the Nsmf_PDUSession_UpdateSMContext Response message to the AMF.

S913: The AMF network element sends an N2 path switch request ack to the target RAN node.

Optionally, once receiving Nsmf_PDUSession_UpdateSMContext responses from all SMFs, the AMF aggregates received core network tunnel information, uses the aggregated information as a part of the N2 SM information, and sends a failed PDU session in the N2 path switch request ack to the target RAN node. If no requested PDU session is successfully switched, the AMF network element sends an N2 path switch request failure message to the target RAN node.

S914: The target RAN node sends a release resources message to the source RAN node.

Optionally, after the target RAN node confirms that the network switching succeeds, the target RAN node requests the source RAN node to release a resource.

S915: The UE generates a first link quality packet message based on the second link quality packet message, where the first link quality packet message includes the link quality information, the indication information, and the status information.

Because the second link quality packet message includes the indication information and the status information, the first link quality packet message also includes the indication information and the status information.

S916: The UE sends the first link quality packet message to the UPF network element by using the target RAN node.

Optionally, the UPF network element may send the first link quality packet message to an NWDA network element.

S917: The UE generates a fourth link quality packet message based on the third link quality packet message, where the fourth link quality packet message includes the link quality information.

Because the third link quality packet message does not include the indication information and the status information, or the indication information indicates no buffer, and the status information indicates normal, the fourth link quality packet message also does not include the indication information and the status information.

S918: The UE sends a fourth link quality packet to the UPF network element by using the target RAN node.

Optionally, the UPF network element may send the fourth link quality packet to the NWDA network element.

It should be noted that the link quality information included in the fourth link quality packet message may be different from the link quality information included in the first link quality packet message.

S919: The UE initiates a registration procedure.

In the embodiment shown in FIG. 9A and FIG. 9B, during a network switching process (the UE is switched from the source RAN node to the target RAN node), after the link quality information is buffered in the source RAN node, the indication information and the status information corresponding to the link quality information are further reported when the link quality information is reported to the NWDA network element. The indication information may indicate that the link quality information is buffered. The status information may indicate a status (switching state) of the source RAN node when the source RAN node buffers the link quality information. After obtaining the reported link quality information, the NWDA may determine, based on the indication information, that the link quality information has been buffered, and determine, based on the status information, a network status of the source RAN node when the source RAN node buffers the link quality information, to perform more accurate network optimization based on the link quality information.

FIG. 10A to FIG. 10D are a schematic flowchart of still another data transmission method according to embodiments of this application. An application scenario shown in FIG. 10A to FIG. 10D is a network switching scenario. UE is switched from a source RAN node to a target RAN node, both an AMF network element and a UPF network element are switched, and a link quality information reporting manner is the link quality information reporting manner 1. Refer to FIG. 10A to FIG. 10D. The method may include the following steps.

S1001: A source AMF network element sends a handover command message to the source RAN node.

Optionally, the command mainly includes a target-to-source transparent container, a to-be-switched PDU session list, and a fail-to-be-established PDU session list.

S1002: The source RAN node sends the handover command message to the UE.

The target-to-source transparent container includes a UE container. The UE container is transparently sent from the target RAN node to the source RAN node by using the AMF network element, and is provided by the source RAN node for the UE.

S1003: The source RAN node sends an uplink radio access status transfer (uplink RAN status transfer) message to the source AMF network element.

Optionally, if radio bearer of the UE is not reserve processed by PDCP, the source RAN node may not need to send an uplink running status transmission message.

S1004: The source AMF network element sends the uplink radio access status transfer (uplink RAN status transfer) message to a target AMF network element.

Optionally, if AMF relocation exists, the source AMF network element may send the uplink radio access status transfer (uplink RAN status transfer) message to the target AMF network element by using an Namf_Communication_NIN2MessageTransfer service operation.

S1005: The target AMF network element sends a downlink radio access status transfer (downlink RAN status transfer) message to the target RAN node.

Optionally, if the target AMF network element is relocated, the target AMF network element sends information (the relocated target AMF network element) to the T-RAN by using the downlink radio access status transfer message.

S1006: A PDU session anchor (PSA) UPF network element sends link quality information to the source RAN node by using a source UPF network element.

Optionally, a communication system may include a plurality of UPF network elements, and the PSA UPF network element is a most source UPF network element that sends the link quality information.

S1007: The source RAN node sends a second link quality packet message to the target RAN node, where the second link quality packet message includes the link quality information, indication information, and status information.

Because the source RAN node buffers the link quality information, the second link quality packet message sent by the source RAN node to the target RAN node includes the indication information and the status information.

Optionally, in S1007, the source RAN node may first send the link quality information to the source UPF network element, and then the source UPF network element sends the link quality information to a target UPF network element. Because the target UPF network element buffers the link quality information, the target UPF network element may send the second link quality packet message to the target RAN node, where the second link quality packet message includes the link quality information, the indication information, and the status information.

S1008: After the UE is successfully switched to the target RAN node, the UE sends a handover acknowledgment message to the target RAN node.

S1009: The target RAN node sends the second link quality packet message to the UE.

Optionally, the target RAN node sends the second link quality packet message to the UE based on the handover acknowledgment message.

S1010: The target RAN node sends a handover notify message to the target AMF network element.

The handover notify message is used to notify the target RAN node of a RAN node to which the UE accesses after successfully switching.

S1011: The target AMF network element sends an N2 handover notify message to the source AMF network element.

Optionally, the target AMF network element may send, to the source AMF network element by invoking Namf_Communication_N2InfoNotify, the N2 handover notify message received from the target RAN node.

S1012: The source AMF network element sends an acknowledgment message to the target AMF network element.

Optionally, the acknowledgment message may be an Namf_Communication_N2InfoNotify ACK.

S1013: The source AMF network element sends an Nsmf PDU session release SM context request (Nsmf_PDUSession_ReleaseSMContext Request) message to an SMF network element.

Optionally, the Nsmf_PDUSession_ReleaseSMContext Request message includes a subscription permanent identifier (SUPI), a PDU session ID, and N2 SM information.

S1014: The target AMF network element sends an Nsmf PDU session update SM context request (Nsmf_PDUSession_UpdateSMContext Request) message to the SMF network element.

Optionally, an Nsmf_PDUSession_UpdateSMContext Request may include a PDU session ID switching complete indication and presence information of the UE in a local area data network (LADN) service area.

S1015: The SMF network element sends an N4 session modification request message to the target UPF network element.

Optionally, when the target UPF network element is inserted or the source UPF network element is reallocated, the SMF network element sends the N4 session modification request message to the target UPF network element. An N4 session modification request may be used to indicate downlink access network tunnel information of the target RAN node.

S1016: The target UPF network element sends an N4 session modification response message to the SMF network element.

S1017: If the UPF network element is not reallocated, the SMF network element sends the N4 session modification request message to the source UPF network element.

The N4 session modification request message is used to indicate the downlink access network tunnel information of the target RAN node.

S1018: The source UPF network element sends the N4 session modification response message to the SMF network element.

S1019: The SMF network element sends the N4 session modification request message to the PSA UPF network element.

In a non-roaming scenario or a local roaming scenario (for example, a local breakout roaming scenario), the SMF network element sends the N4 session modification response message to the PSA UPF network element, and provides N3 access network tunnel information of the target RAN node or downlink core network tunnel information of the target UPF network element.

S1020: The PSA UPF network element sends the N4 session modification response message to the SMF network element.

It should be noted that when there are a plurality of PSA UPF network elements, the SMF network element sends an N4 session modification request message to each PSA UPF network element. Correspondingly, each PSA UPF network element sends an N4 session modification response message to the SMF network element.

S1021: The PSA UPF network element sends a third link quality packet message to the UE by using the target UPF network element and the target RAN node, where the third link quality packet message includes link quality information.

It should be noted that the link quality information included in the third link quality packet message may be different from the link quality information included in the second link quality packet message.

Because the PSA UPF network element, the target UPF network element, and the target RAN node all do not buffer the link quality information, the third link quality packet message received by the UE does not include the indication information and the status information.

S1022: The UE generates a first link quality packet message based on the second link quality packet message, where the first link quality packet message includes the link quality information, the indication information, and the status information.

Because the second link quality packet message includes the indication information and the status information, the first link quality packet message also includes the indication information and the status information.

S1023: The UE sends the first link quality packet message to the PSA UPF network element by using the target RAN node and the target UPF network element.

Optionally, the PSA UPF network element may send the first link quality packet message to an NWDA network element.

S1024: The UE generates a fourth link quality packet message based on the third link quality packet message, where the fourth link quality packet message includes link quality information.

Because the third link quality packet message does not include the indication information and the status information, the fourth link quality packet message also does not include the indication information and the status information.

S1025: The UE sends a fourth link quality packet to the PSA UPF network element by using the target RAN node and the target UPF network element.

Optionally, the PSA UPF network element may send the fourth link quality packet to the NWDA network element.

It should be noted that the link quality information included in the fourth link quality packet message may be different from the link quality information included in the first link quality packet message.

S1026: The SMF network element sends an Nsmf PDU session update SM context response (Nsmf_PDUSession_UpdateSMContext Response) message to the target AMF network element.

Optionally, the Nsmf_PDUSession_UpdateSMContext Response message may include the PDU session ID.

Optionally, if an indirect data forwarding manner is used, the SMF network element may start an indirect data forwarding timer, to release a resource of an indirect data forwarding tunnel.

S1027: The UE performs a mobility registration update process.

Optionally, when the target AMF network element knows a switching process, the target AMF network element performs only some subprocedures in a registration process.

S1028: The SMF network element sends an N4 session release request message to the source UPF network element.

Optionally, when a source intermediate UPF network element exists, the SMF network element sends the N4 session release request message to the source UPF network element. When a timer or the indirect data forwarding timer expires, the SMF starts resource release.

S1029: The source UPF network element sends an N4 session release response message to the SMF network element.

S1030: The source AMF network element sends a UE context release command to the source RAN node.

Optionally, after the timer expires, the source AMF network element sends the UE context release command to the source RAN node.

S1031: The source RAN node sends a resource release complete acknowledgment response to the source AMF network element.

Optionally, the source RAN node first releases a resource related to the UE, and then sends the resource release complete acknowledgment response to the source AMF network element.

S1032: The SMF network element sends the N4 session modification request message to the target UPF network element.

Optionally, if indirect forwarding is enabled and a UPF is reallocated, after the indirect data forwarding timer expires, the SMF network element sends the N4 session modification request message to the target UPF network element, to release an indirect data forwarding resource.

S1033: The target UPF network element sends the N4 session modification response message to the SMF network element.

Optionally, the target UPF network element may first release a resource related to indirect data forwarding, and then send the N4 session modification response message to the SMF network element.

In the embodiment shown in FIG. 10A to FIG. 10D, during a network switching process, the link quality information may be buffered in the source RAN node, or may be buffered in the target UPF network element. After the link quality information is buffered, the indication information and the status information corresponding to the link quality information are further reported when the link quality information is reported to the NWDA network element. The indication information may indicate that the link quality information is buffered, and the status information may indicate a status (a switching state) of an apparatus (the source RAN node or the target UPF network element) when the apparatus buffers the link quality information. After obtaining the link quality information reported by an SPA UPF network element, the NWDA network element may determine, based on the indication information, that the link quality information has been buffered, and determine, based on the status information, a network status of the apparatus (the source RAN node or the target UPF network element) when the apparatus buffers the link quality information, to perform more accurate network optimization based on the link quality information.

Figure 11A:
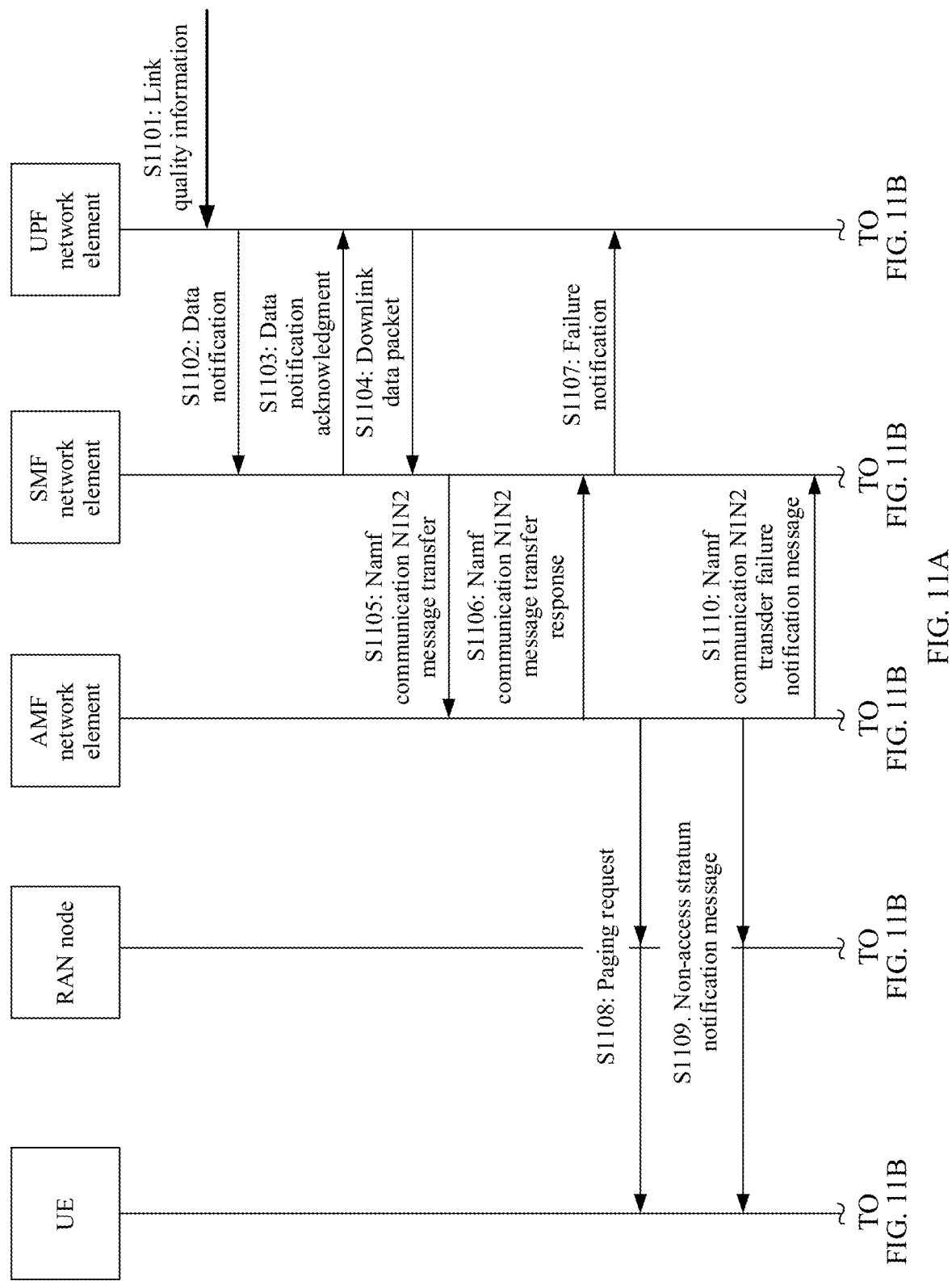
FIG. 11A and FIG. 11B are a schematic flowchart of yet another data transmission method according to an embodiment of this application.
Figure 11B:
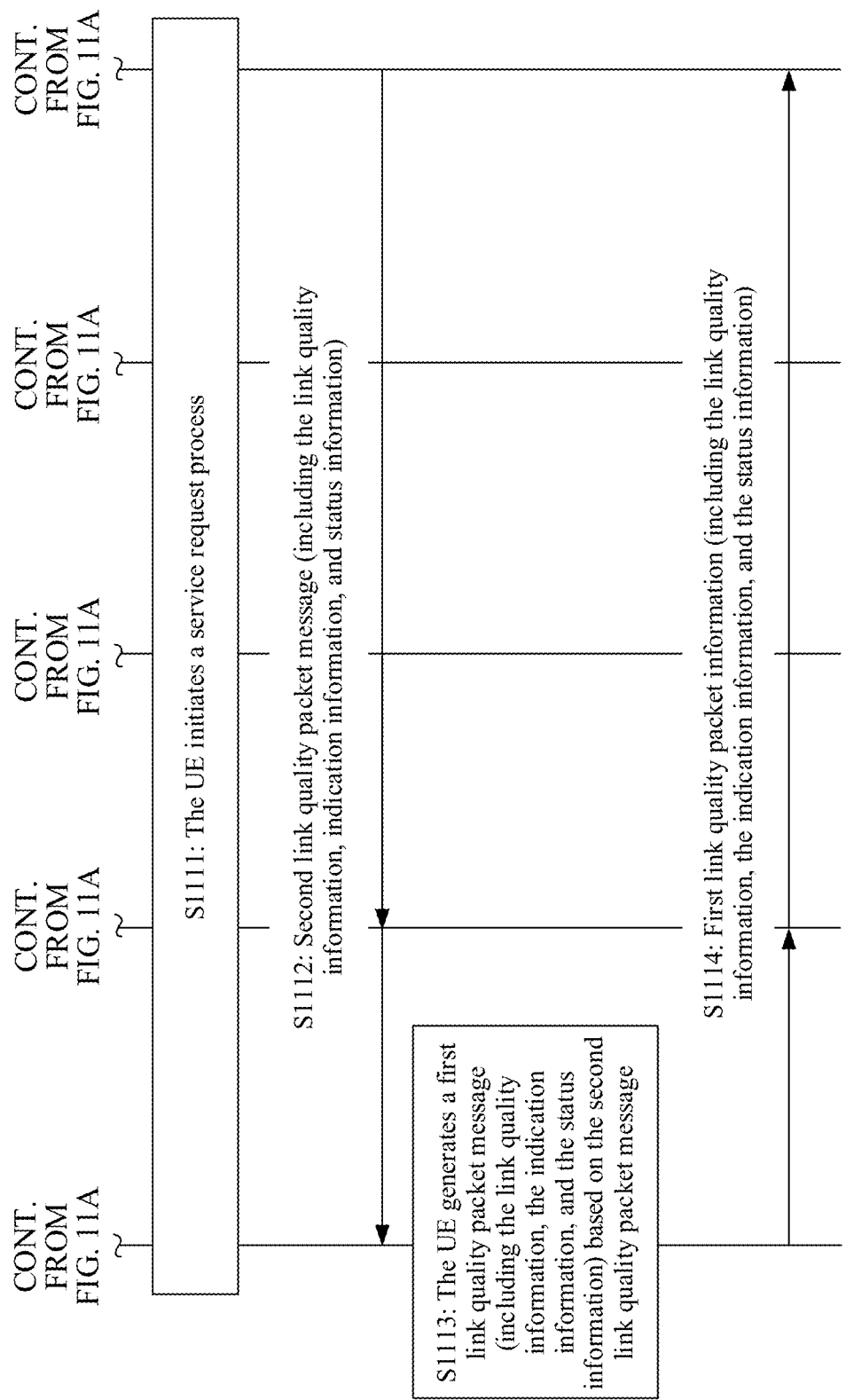

FIG. 11A and FIG. 11B are a schematic flowchart of yet another data transmission method according to embodiments of this application. An application scenario shown in FIG. 11A and FIG. 11B is a network paging scenario, and a link quality information reporting manner is the link quality information reporting manner 1. Refer to FIG. 11A and FIG. 11B. The method may include the following steps.

S1101: A UPF network element receives link quality information.

Optionally, the UPF network element may receive link quality information sent by a PSA UPF network element.

S1102: The UPF network element sends a data notification to an SMF network element.

Optionally, the data notification may include an N4 session ID, information used to identify a downlink data packet QoS flow, and a differentiated services code point (DSCP).

S1103: The SMF network element sends a data notification acknowledgment to the UPF network element.

S1104: The UPF network element sends a downlink data packet to the SMF network element.

S1105: The SMF network element sends an Namf communication N1N2 message transfer (Namf_Communication_N1N2MessageTransfer) to an AMF network element.

Optionally, the Namf_Communication_N1N2MessageTransfer may include a PDU session ID. If the data notification from the UPF network element in S1102 triggers this step, the SMF network element determines the PDU session ID based on the N4 session ID received in S1102.

S1106: The AMF network element sends an Namf communication N1N2 message transfer (Namf_Communication_N1N2MessageTransfer) response to the SMF network element.

Optionally, based on different statuses (for example, CM-IDLE or CM-CONNECTED) of UE in the AMF, the AMF network element sends Namf_Communication_N1N2MessageTransfer responses carrying different message content (for example, "Attempt to arrive at UE" "N1/N2 transmission succeeded") to the SMF network element.

S1107: The SMF network element sends a failure notification to the UPF network element.

The failure notification is used to indicate that a user plane setting fails. If the SMF network element receives, from the AMF network element, an indication that the UE is unreachable or is only configured to monitor a priority service, the SMF network element may indicate, according to a network policy, the UPF network element to stop sending the data notification, stop buffering downlink data, and discard buffered data.

S1108: The AMF network element sends a paging request to the UE by using a RAN node.

Optionally, when the UE is in the CM-IDLE state in 3GPP access, and the PDU session ID received from the SMF network element in S1105 has been associated with the 3GPP access, the AMF network element makes a decision and notifies the UE through the 3GPP access.

S1109: The AMF network element sends a non-access stratum (NAS) notification message to the UE.

Optionally, the UE registers in a same public land mobile network (PLMN) at the same time through the 3GPP access and non-3GPP access, and the UE is in the CM-CONNECTED state in the 3GPP access or the non-3GPP access. According to a local policy, the AMF network element makes a decision, notifies the UE through the 3GPP access or the non-3GPP access, sends a NAS notification message that includes a 3GPP access type or a non-3GPP access type to the UE, and sets a notification timer.

S1110: The AMF network element sends an Namf communication N1N2 transmission failure notification (Namf_Communication_N1N2TransferFailureNotification) message to the SMF network element.

Optionally, when the UE does not respond to paging, the AMF sends the Namf_Communication_N1N2TransferFailureNotification message to the SMF.

S1111: The UE initiates a service request procedure.

Optionally, when the UE is in the CM-IDLE state in the 3GPP access or the non-3GPP access, the UE initiates the service request procedure when receiving a PDU session paging request associated with the non-3GPP access.

S1112: The UPF network element sends a second link quality packet message to the UE by using the RAN node, where the second link quality packet message includes the link quality information, indication information, and status information.

Because the UPF network element buffers the link quality information, the second link quality packet message sent by the UPF network element includes the indication information and the status information.

S1113: The UE generates a first link quality packet message based on the second link quality packet message, where the first link quality packet message includes the link quality information, the indication information, and the status information.

Because the second link quality packet message includes the indication information and the status information, the first link quality packet message also includes the indication information and the status information.

S1114: The UE sends the first link quality packet information to the UPF network element by using the RAN node.

Optionally, the UPF network element may send the first link quality packet message to an NWDA network element.

In the embodiment shown in FIG. 11A and FIG. 11B, in a paging process, after downlink link quality information is buffered in the UPF network element, indication information and status information corresponding to link quality information are further reported when the uplink link quality information is reported to the NWDA network element. The indication information may indicate that the link quality information is buffered, and the status information may indicate a status (a paging state) of the UPF network element when the UPF network element buffers the link quality information. After obtaining the reported link quality information, the NWDA may determine, based on the indication information, that the link quality information has been buffered, and determine, based on the status information, a network status of the UPF network element when the UPF network element buffers the link quality information, to perform more accurate network optimization based on the link quality information.

Figure 12:
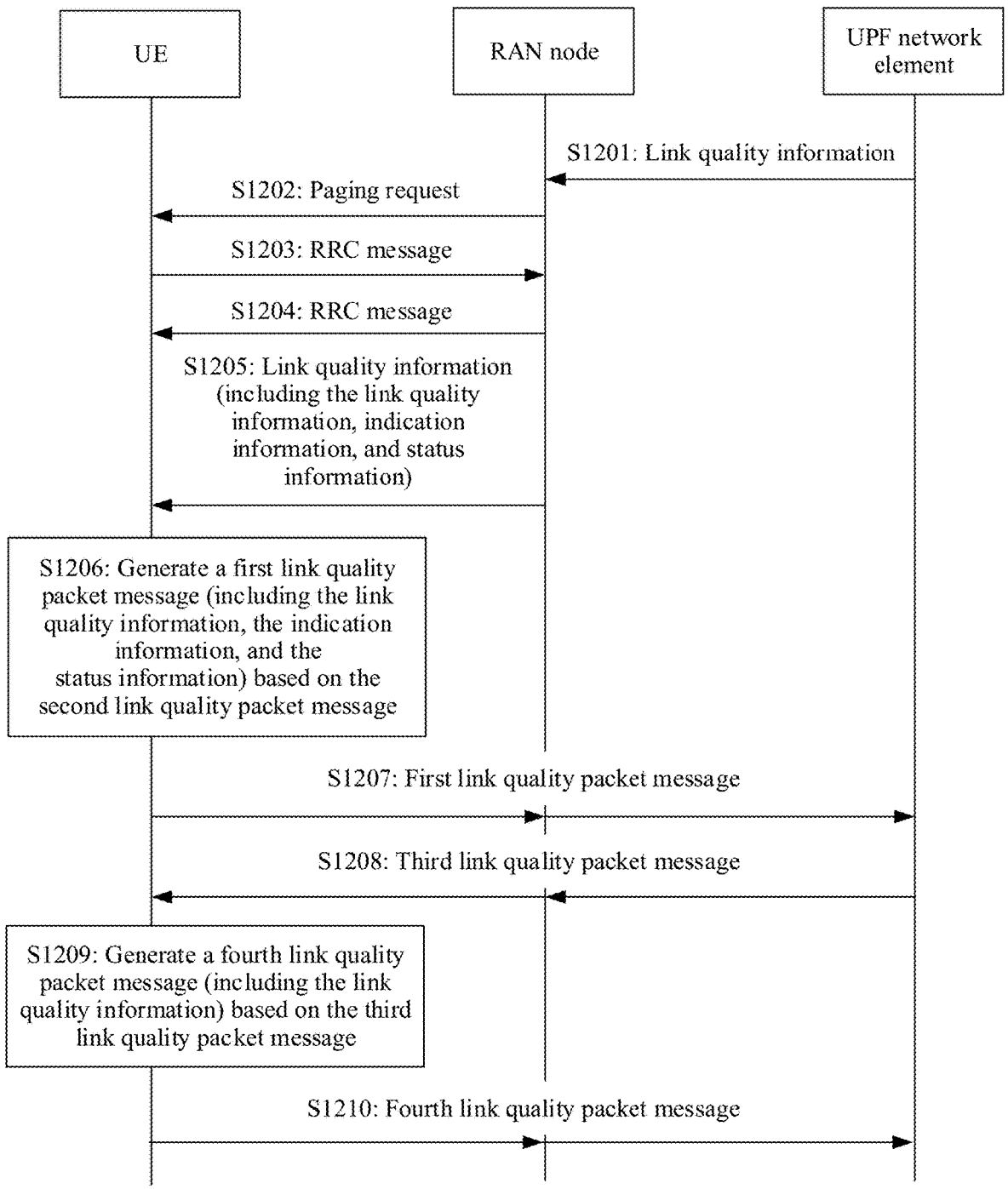
FIG. 12 is a schematic flowchart of still yet another data transmission method according to an embodiment of this application.

FIG. 12 is a schematic flowchart of still yet another data transmission method according to embodiments of this application. An application scenario shown in FIG. 12 is a network paging scenario, and a link quality information reporting manner is the link quality information reporting manner 1. Refer to FIG. 12. The method may include the following steps.

S1201: A UPF network element sends link quality information to a RAN node.

S1202: The RAN node sends a paging request to UE based on the link quality information.

The link quality information is buffered on the RAN node.

S1203: The UE sends a radio resource control (RRC) message to the RAN node.

Optionally, after the UE receives the paging request, the UE initiates switching from an RRC inactive state to an RRC connected state, and the UE provides a resume ID required by the RAN node, to access a context stored in the UE.

S1204: The RAN node sends an RRC message to the UE.

The RRC message sent by the RAN node to the UE is used to acknowledge, to the UE, that the UE has entered the RRC connected state.

S1205: The RAN node sends a second link quality packet message to the UE, where the second link quality packet message includes the link quality information, indication information, and status information.

Because the RAN node buffers the link quality information, the second link quality packet message sent by the RAN node to the UE includes the indication information and the status information.

S1206: The UE generates a first link quality packet message based on the second link quality packet message, where the first link quality packet message includes the link quality information, the indication information, and the status information.

Because the second link quality packet message includes the indication information and the status information, the first link quality packet message includes the indication information and the status information.

S1207: The UE sends the first link quality packet message to the UPF network element by using the RAN node.

Optionally, the UPF network element may send the first link quality packet message to an NWDA network element.

S1208: The UPF network element sends a third link quality packet message to the UE by using the RAN node, where the third link quality packet message includes link quality information.

It should be noted that the link quality information included in the third link quality packet message is different from the link quality information included in the second link quality packet message (or the first link quality packet message).

S1209: The UE generates a fourth link quality packet message based on the third link quality packet message, where the third link quality packet message includes the link quality information.

Because the third link quality packet message does not include the indication information and the status information, the fourth link quality packet message also does not include the indication information and the status information.

S1210: The UE sends the fourth link quality packet message to the UPF network element by using the RAN node.

Optionally, the UPF network element may send the fourth link quality packet message to the NWDA network element.

In the embodiment shown in FIG. 12, in a paging process, after downlink link quality information is buffered in the RAN node, indication information and status information corresponding to link quality information are further reported when the uplink link quality information is reported to the NWDA network element. The indication information may indicate that the link quality information is buffered, and the status information may indicate a status (a paging state) of the RAN node when the UPF network element buffers the link quality information. After obtaining the reported link quality information, the NWDA network element may determine, based on the indication information, that the link quality information has been buffered, and determine, based on the status information, a network status of the RAN node when the RAN node buffers the link quality information, to perform more accurate network optimization based on the link quality information.

Figure 13A:
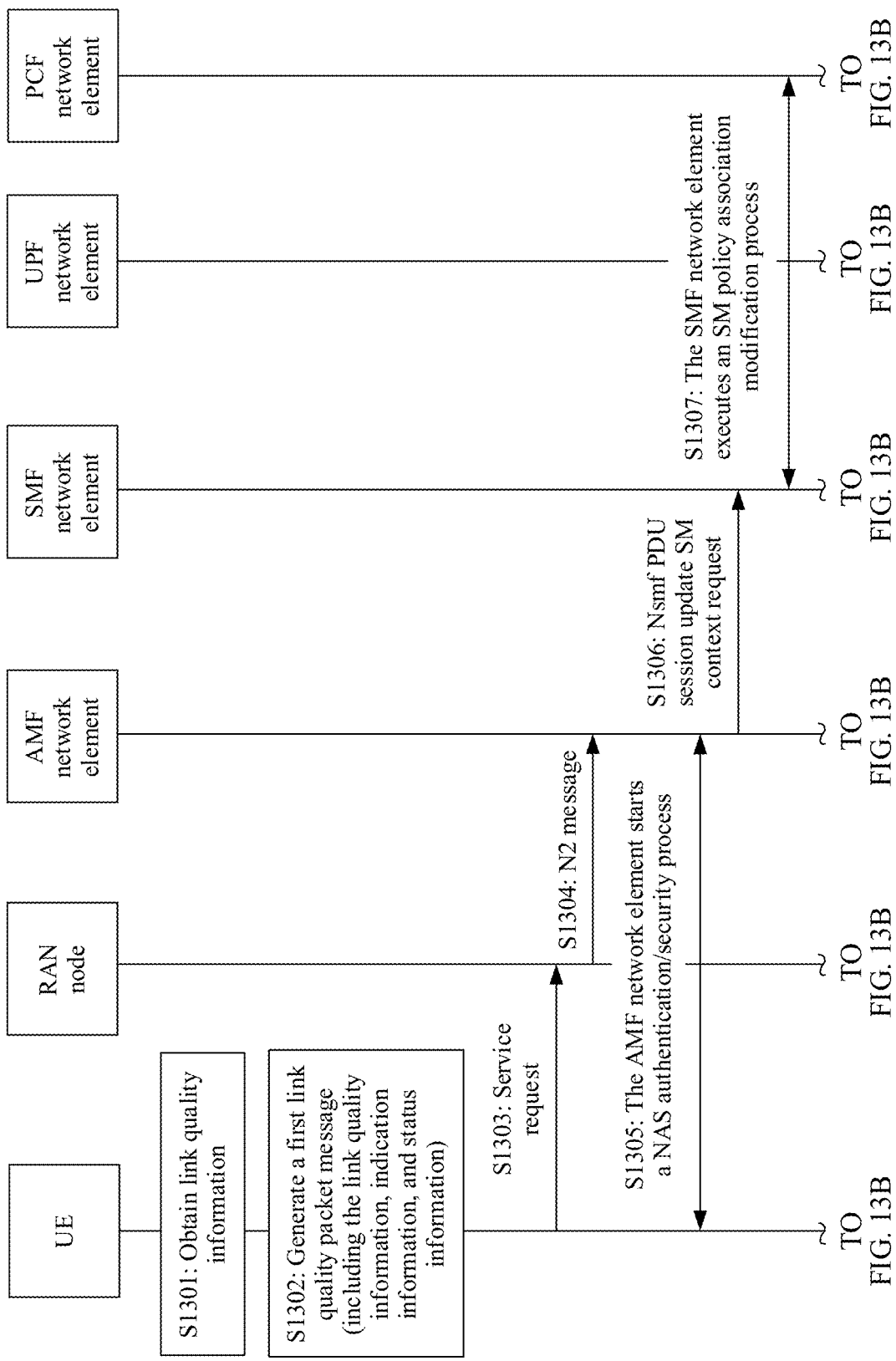

FIG. 13A and FIG. 13B are a schematic flowchart of a further data transmission method according to embodiments of this application. An application scenario is that UE is in a service requesting state, and a link quality information reporting manner is the link quality information reporting manner 2. Refer to FIG. 13A and FIG. 13B. The method may include the following steps.

S1301: The UE obtains link quality information.

S1302: The UE generates a first link quality packet message, where the first link quality packet message includes the link quality information, indication information, and status information.

S1303: The UE sends a service request to a RAN node.

Optionally, the service request may include an access network message, and the access network message includes an access network parameter, a need-to-be-activated PDU session list, a security parameter, a PDU session status, and a 5G-S-temporary mobile subscriber identity (temporary mobile subscriber identity, TMSI).

S1304: The RAN node sends an N2 message to an AMF network element.

Optionally, the N2 message may include an N2 parameter and the service request.

S1305: The AMF network element starts a NAS authentication/security process.

S1306: The AMF network element sends an Nsmf PDU session update SM context (Nsmf_PDUSession_UpdateSMContext) request to an SMF network element.

The Nsmf_PDUSession_UpdateSMContext request may include a PDU session ID, an operation type, UE location information, an access type, a radio access technology (RAT) type, UE presence information in an LADN service area, and an indication for allowing an access type to be changed.

S1307: The SMF network element executes an SM policy association modification process.

Optionally, if the AMF network element notifies the SMF network element that an access type of a PDU session can be changed in S1306, and policy and charging control (PCC) is deployed, the SMF performs the SM policy association modification process.

S1308: The SMF network element determines, based on a selection identifier of a UPF, to perform a subsequent operation.

Optionally, the SMF network element may determine, based on location information received from the AMF network element and a selection identifier of the UPF, to perform the subsequent operation, for example, including: accepting activation of a UPF connection and continuing to use a current UPF, and accepting activation of a user plane connection and selecting a new intermediate UPF (or adding/deleting an intermediate UPF).

S1309: The SMF network element sends an N4 session modification request message to the UPF network element.

Optionally, the SMF network element may change, based on a network deployment status, core network tunnel information of a UPF (PSA) allocated to an N3 or N9 interface during a service request process.

Optionally, the UPF network element may be a PSA UPF network element.

S1310: The UPF network element sends an N4 session modification response message to the SMF network element.

Optionally, if the UPF network element allocates core network tunnel information of the UPF network element, the UPF network element provides the core network tunnel information for the SMF network element. The UPF network element associates the core network tunnel information with an uplink packet detection rule provided by the SMF network element.

S1311: The SMF network element sends an Nsmf PDU session update SM context (Nsmf_PDUSession_UpdateSMContext) response to the AMF network element.

Optionally, the Nsmf_PDUSession_UpdateSMContext response mainly includes N2 SM information, the PDU session ID, a QoS flow identity (QFI), a QoS profile, core network N3 tunnel information, single network slice selection assistance information (S-NSSAI), user plane security enforcement, and a maximum UE integrity protection rate.

S1312: The AMF network element sends an N2 request to the RAN node.

Optionally, the N2 request may include N2 session information received by the SMF network element, a security context, a mobility restriction list, a subscribed UE aggregate maximum bit rate (AMBR), MM non-access stratum service acceptance, a recommended cell and a RAN node identifier, a UE radio capability, core network assistance information, and a tracking requirement.

S1313: The RAN node performs RRC connection reconfiguration with the UE.

Optionally, the RAN node may perform the RRC connection reconfiguration with the UE based on QoS information and data radio bearer information of all QoS flows.

S1314: The UE sends the first link quality packet message to the UPF network element by using the RAN node, where the first link quality packet message includes the link quality information, the indication information, and the status information.

Optionally, the UPF network element may send the first link quality packet message to an NWDA network element.

In the embodiment shown in FIG. 13A and FIG. 13B, after the UE buffers the link quality information, the UE further reports the indication information and the status information corresponding to the link quality information when reporting the link quality information to the NWDA network element. The indication information may indicate that the link quality information is buffered, and the status information may indicate a status (a service requesting state) of the UE when the UE buffers the link quality information. After obtaining the reported link quality information, the NWDA network element may determine, based on the indication information, that the link quality information has been buffered, and determine, based on the status information, a network status of the UE when the UE buffers the link quality information, to perform more accurate network optimization based on the link quality information.

Figure 14:
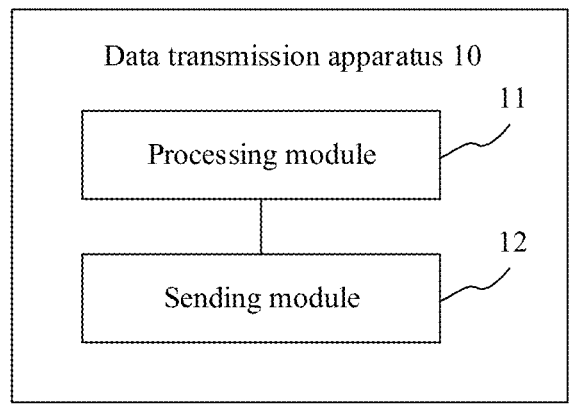
FIG. 14 is a schematic diagram of a structure of a data transmission apparatus according to an embodiment of this application.

FIG. 14 is a schematic diagram of a structure of a data transmission apparatus according to embodiments of this application. A data transmission apparatus 10 may be disposed in a first apparatus. Refer to FIG. 14. The data transmission apparatus 10 includes a processing module 11 and a sending module 12.

The processing module 11 is configured to obtain a first link quality packet message, where the first link quality packet message includes link quality information and indication information, and the indication information is used to indicate that the link quality information is buffered.

The sending module 12 is configured to send the first link quality packet message to a second apparatus, where the first link quality packet message is used by the second apparatus to perform network optimization based on the first link quality packet message.

Optionally, the processing module 11 may perform steps that are performed by the first apparatus in the foregoing method embodiments and that are related to the processing actions, and the sending module 12 may perform steps that are performed by the first apparatus in the foregoing method embodiments and that are related to the sending actions.

It should be noted that the data transmission apparatus provided in embodiments of this application may perform technical solutions shown in the foregoing method embodiments. Implementation principles and beneficial effects of the data transmission apparatus are similar to those of the technical solutions, and details are not described herein again.

In a possible implementation, the first link quality packet message further includes status information. The status information is used to indicate a status of an apparatus for buffering the link quality packet when the link quality information is buffered, and the status includes one of the following states: a switching state, a paging state, or a service requesting state.

Figure 15:
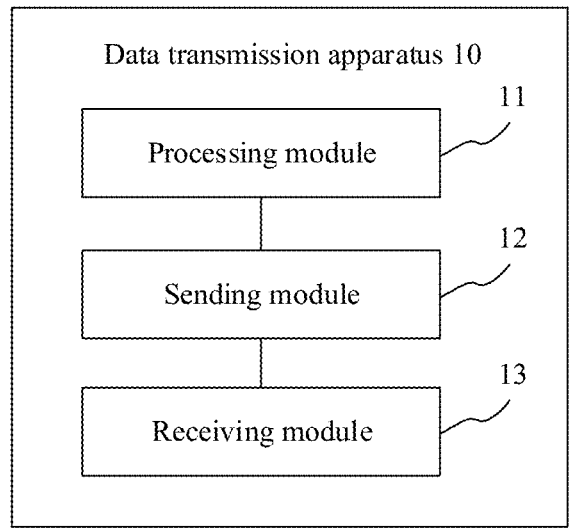
FIG. 15 is a schematic diagram of a structure of another data transmission apparatus according to an embodiment of this application.

FIG. 15 is a schematic diagram of a structure of another data transmission apparatus according to embodiments of this application. Based on the embodiment shown in FIG. 14, the first apparatus is a user plane function UPF network element, a radio access network RAN node, or a session management function SMF network element. Refer to FIG. 15. The data transmission apparatus may further include a receiving module 13.

The receiving module 13 is configured to receive a first link quality packet message from a terminal apparatus.

In a possible implementation, the first apparatus is the terminal apparatus. The receiving module 13 is further configured to:
  receive a second link quality packet message, where the second link quality packet message includes the link quality information and the indication information; and
  generate the first link quality packet message based on the second link quality packet message.

In a possible implementation, the second link quality packet message is generated by a third apparatus based on the link quality information and the indication information after the link quality information is buffered, and the third apparatus is a UPF network element or a RAN node.

In a possible implementation, the second link quality packet message further includes status information, and the first link quality information further includes the status information.

In a possible implementation, the second link quality packet message is generated by the third apparatus based on the link quality information, the indication information, and the status information after the link quality information is buffered, and the third apparatus is a UPF network element or a RAN node.

In a possible implementation, the first apparatus is the terminal apparatus. The processing module 11 is configured to:
  obtain the link quality information; and
  if the first apparatus buffers the link quality information, generate the first link quality packet message based on the link quality information and the indication information.

In a possible implementation, the processing module 11 is configured to:
  obtain the status information based on a status of the first apparatus; and
  generate the first link quality packet message based on the link quality information, the indication information, and the status information, where the first link quality packet message further includes the status information.

It should be noted that the data transmission apparatus provided in embodiments of this application may perform technical solutions shown in the foregoing method embodiments. Implementation principles and beneficial effects of the data transmission apparatus are similar to those of the technical solutions, and details are not described herein again.

Figure 16:
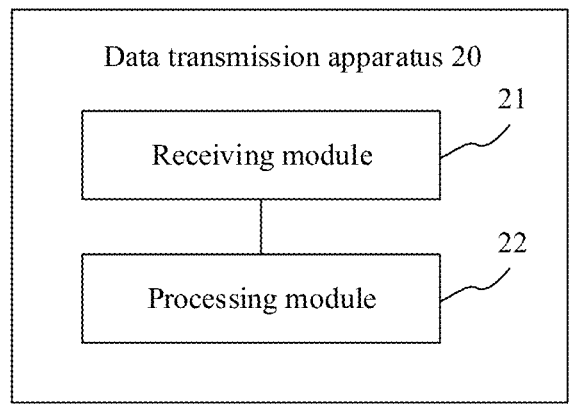
FIG. 16 is a schematic diagram of a structure of still another data transmission apparatus according to an embodiment of this application.

FIG. 16 is a schematic diagram of a structure of still another data transmission apparatus according to embodiments of this application. A data transmission apparatus 20 may be disposed in a second apparatus. Refer to FIG. 16. The data transmission apparatus 20 may include a receiving module 21 and a processing module 22.

The receiving module 21 is configured to receive a first link quality packet message sent by a first apparatus, where the first link quality packet message includes link quality information and indication information, and the indication information is used to indicate that the link quality information is buffered.

The processing module 22 is configured to perform network optimization based on the first link quality packet message.

Optionally, the receiving module 21 may perform steps that are performed by the second apparatus in the foregoing method embodiments and that are related to the receiving actions, and the processing module 22 may perform steps that are performed by the second apparatus in the foregoing method embodiments and that are related to the processing actions.

It should be noted that the data transmission apparatus provided in embodiments of this application may perform technical solutions shown in the foregoing method embodiments. Implementation principles and beneficial effects of the data transmission apparatus are similar to those of the technical solutions, and details are not described herein again.

In a possible implementation, the first link quality packet message further includes status information. The status information is used to indicate a status of an apparatus for buffering the link quality packet when the link quality information is buffered, and the status information includes one of the following states: a switching state, a paging state, or a service requesting state.

It should be noted that the data transmission apparatus provided in embodiments of this application may perform technical solutions shown in the foregoing method embodiments. Implementation principles and beneficial effects of the data transmission apparatus are similar to those of the technical solutions, and details are not described herein again.

Figure 17:
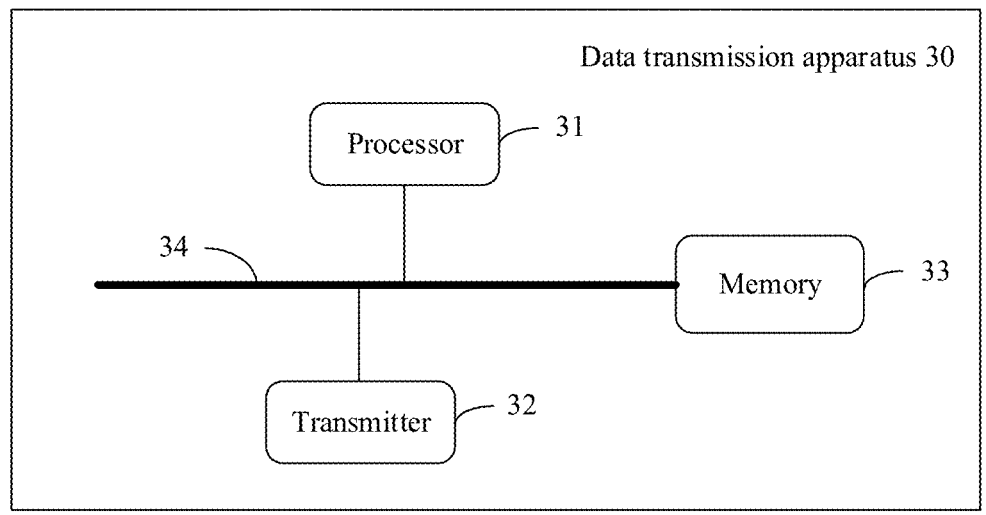
FIG. 17 is a schematic diagram of a hardware structure of a data transmission apparatus according to an embodiment of this application.

FIG. 17 is a schematic diagram of a hardware structure of a data transmission apparatus according to embodiments of this application. Refer to FIG. 17. A data transmission apparatus 30 may include a processor 31, a transmitter 32, a memory 33, and a communication bus 34. The processor 31, the transmitter 32, and the memory 33 communicate through the communication bus 34. The processor 31 executes program instructions in the memory 33.

The processor 31 is configured to obtain a first link quality packet message, where the first link quality packet message includes link quality information and indication information, and the indication information is used to indicate that the link quality information is buffered.

The transmitter 32 is configured to send the first link quality packet message to a second apparatus, where the first link quality packet message is used by the second apparatus to perform network optimization based on the first link quality packet message.

Optionally, the processor 31 may have functions of the processing module 11 in FIG. 14 and FIG. 15. The transmitter 32 may have functions of the sending module 12 in FIG. 14 and FIG. 15.

It should be noted that the data transmission apparatus provided in embodiments of this application may perform technical solutions shown in the foregoing method embodiments. Implementation principles and beneficial effects of the data transmission apparatus are similar to those of the technical solutions, and details are not described herein again.

In a possible implementation, the first link quality packet message further includes status information. The status information is used to indicate a status of an apparatus for buffering the link quality packet when the link quality information is buffered, and the status includes one of the following states: a switching state, a paging state, or a service requesting state.

Figure 18:
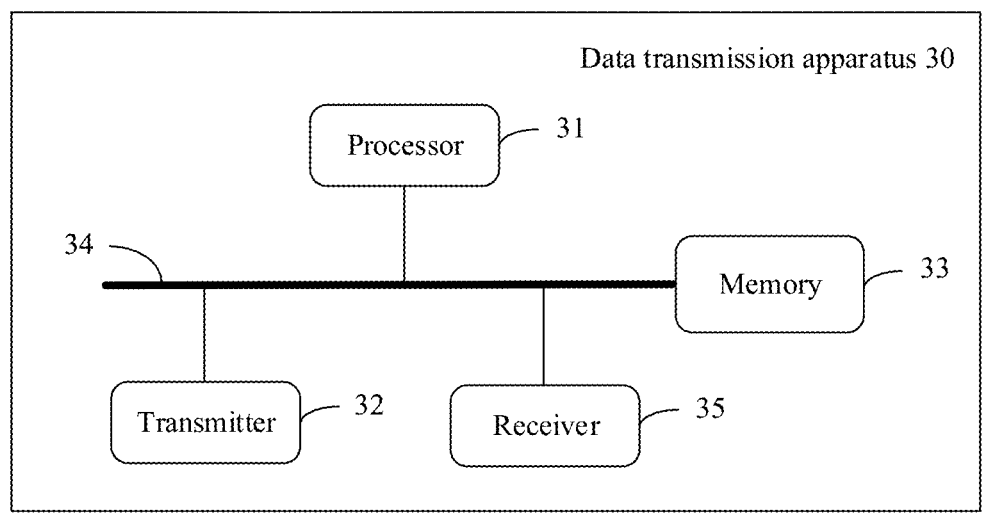
FIG. 18 is a schematic diagram of a hardware structure of another data transmission apparatus according to an embodiment of this application.

FIG. 18 is a schematic diagram of a hardware structure of another data transmission apparatus according to embodiments of this application. The data transmission apparatus 30 is a user plane function UPF network element, a radio access network RAN node, or a session management function SMF network element. The data transmission apparatus 30 may further include a receiver 35, where the receiver 35 is configured to:

receive the first link quality packet message from a terminal apparatus.

In a possible implementation, the data transmission apparatus 30 is the terminal apparatus.

The receiver 35 is configured to receive a second link quality packet message, where the second link quality packet message includes nk quality information and the indication information.

The processor 31 is configured to generate the first link quality packet message based on the second link quality packet message.

In a possible implementation, the second link quality packet message is generated by a third apparatus based on the link quality information and the indication information after the link quality information is buffered, and the third apparatus is a UPF network element or a RAN node.

In a possible implementation, the second link quality packet message further includes status information, and the first link quality information further includes the status information.

In a possible implementation, the second link quality packet message is generated by the third apparatus based on the link quality information, the indication information, and the status information after the link quality information is buffered, and the third apparatus is a UPF network element or a RAN node.

In a possible implementation, the data transmission apparatus 30 is the terminal apparatus. The processor 31 is configured to:

obtain the link quality information; and if the data transmission apparatus 30 buffers the link quality information, generate the first link quality packet message based on the link quality information and the indication information.

In a possible implementation, the processing module 31 is configured to:

obtain the status information based on a status of the data transmission apparatus; and generate the first link quality packet message based on the link quality information, the indication information, and the status information, where the first link quality packet message further includes the status information.

It should be noted that the data transmission apparatus provided in embodiments of this application may perform technical solutions shown in the foregoing method embodiments. Implementation principles and beneficial effects of the data transmission apparatus are similar to those of the technical solutions, and details are not described herein again.

Figure 19:
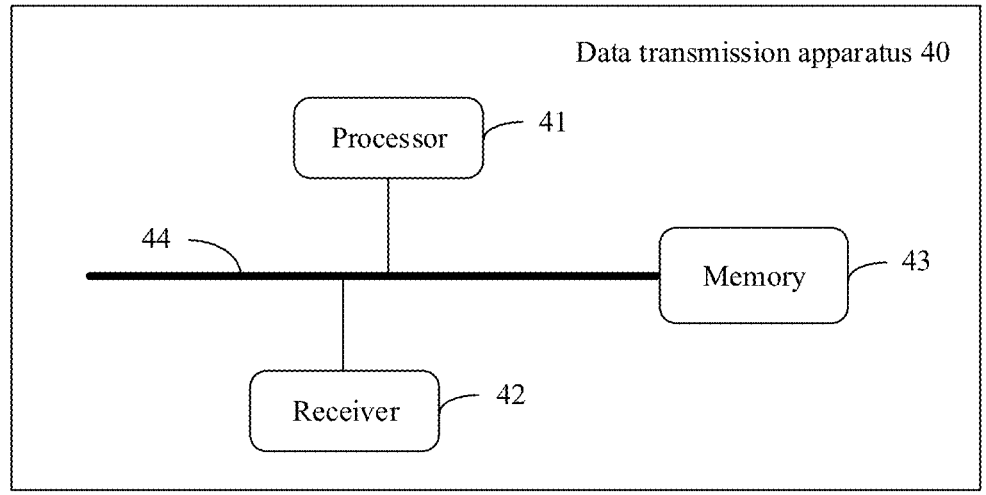
FIG. 19 is a schematic diagram of a hardware structure of still another data transmission apparatus according to an embodiment of this application.

FIG. 19 is a schematic diagram of a hardware structure of still another data transmission apparatus according to embodiments of this application. Refer to FIG. 19. A data transmission apparatus 40 may include a processor 41, a receiver 42, a memory 43, and a communication bus 44. The processor 41, the receiver 42, and the memory 43 communicate through the communication bus 44. The processor 41 executes program instructions in the memory 43.

The receiver 42 is configured to receive a first link quality packet message sent by the data transmission apparatus, where the first link quality packet message includes link quality information and indication information, and the indication information is used to indicate that the link quality information is buffered.

The processor 41 is configured to perform network optimization based on the first link quality packet message.

Optionally, the processor 41 may have functions of the processing module 22 in FIG. 16. The transmitter 32 may have functions of the receiving module 21 in FIG. 16.

It should be noted that the data transmission apparatus provided in embodiments of this application may perform technical solutions shown in the foregoing method embodiments. Implementation principles and beneficial effects of the data transmission apparatus are similar to those of the technical solutions, and details are not described herein again.

In a possible implementation, the first link quality packet message further includes status information. The status information is used to indicate a status of an apparatus for buffering the link quality packet when the link quality information is buffered, and the status information includes one of the following states: a switching state, a paging state, or a service requesting state.

It should be noted that the data transmission apparatus provided in embodiments of this application may perform technical solutions shown in the foregoing method embodiments. Implementation principles and beneficial effects of the data transmission apparatus are similar to those of the technical solutions, and details are not described herein again.

Embodiments of this application provides a storage medium. The storage medium is configured to store a computer program. The computer program is used to implement the data transmission method described in the foregoing embodiments.

Embodiments of this application provides a computer program product. The computer program product includes instructions; and when the instructions are executed, a computer is enabled to perform the data transmission method.

Embodiments of this application provides a system-on-a-chip or a system chip. The system-on-a-chip or the system chip may be used in an electronic device, and the system-on-a-chip or the system chip includes at least one communication interface, at least one processor, and at least one memory. The communication interface, the memory, and the processor are interconnected through a bus, and the processor executes instructions stored in the memory, so that the terminal device can perform the data transmission method.

Figure 20:
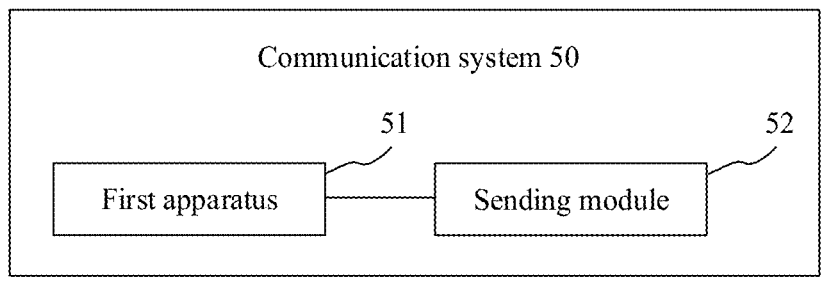
FIG. 20 is a schematic diagram of a structure of a communication system according to an embodiment of this application.

FIG. 20 is a schematic diagram of a structure of a communication system according to embodiments of this application. Refer to FIG. 20. A communication system 50 may include a first apparatus 51 and a second apparatus 52.

The first apparatus 51 may be the data transmission apparatus 30 shown in FIG. 17 and FIG. 18, and the second apparatus 52 may be the data transmission apparatus 40 shown in the embodiment in FIG. 19.

It should be noted that the first apparatus 51 and the second apparatus 52 may perform technical solutions shown in the foregoing method embodiments. Implementation principles and beneficial effects of the first apparatus and the second apparatus are similar to those of the technical solutions, and details are not described herein again.

Figure 21:
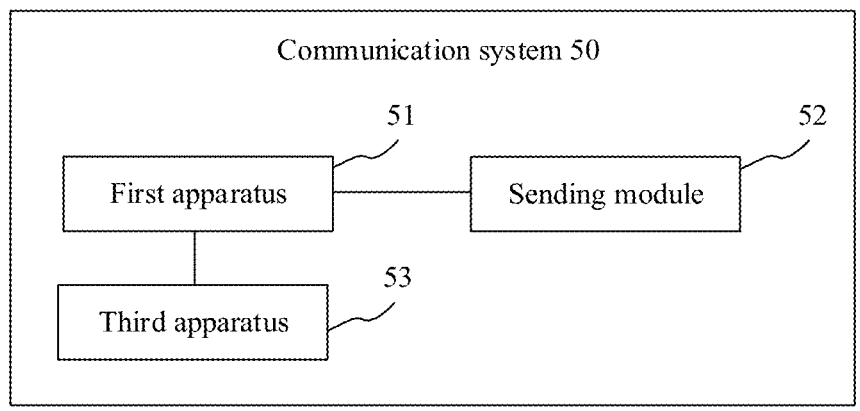
FIG. 21 is a schematic diagram of a structure of another communication system according to an embodiment of this application.

FIG. 21 is a schematic diagram of a structure of another communication system according to embodiments of this application. Based on the embodiment shown in FIG. 20, refer to FIG. 21. The communication system 50 further includes a third apparatus 53, where the third apparatus 53 is configured to: buffer link quality information, generate a link quality packet message after the link quality information is buffered, and send the link quality packet message to the first apparatus 51.

The link quality packet message includes the link quality information and indication information, or the link quality packet message includes the link quality information, the indication information, and status information.

In a possible implementation, the first apparatus is a user plane function UPF network element, a radio access network RAN node, a session management function SMF network element, or a terminal apparatus; the second apparatus is a network data analysis NWDA network element; and the third apparatus is a UPF network element or a RAN node.

All or some of the steps of the method embodiments may be implemented by a program instructing related hardware. The foregoing program may be stored in a readable memory. When the program is executed, the steps of the foregoing method embodiment are performed. The foregoing memory (storage medium) includes a read-only memory (ROM), a RAM, a flash memory, a hard disk, a solid-state drive, a magnetic tape, a floppy disk, a compact disc (optical disc), and any combination thereof.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processing unit of any other programmable data processing device to generate a machine, so that the instructions executed by the computer or the processing unit of the any other programmable data processing device generate an apparatus for implementing a specific function in one or more processes in the flowcharts and/or in one or more blocks in the block diagrams.

The computer program instructions may be stored in a computer-readable memory that can instruct the computer or the any other programmable data processing device to work in a specific manner, so that the instructions stored in the computer-readable memory generate an artifact that includes an instruction apparatus. The instruction apparatus implements the specific function in the one or more processes in the flowcharts and/or in the one or more blocks in the block diagrams.

These computer program instructions may alternatively be loaded onto the computer or the any other programmable data processing device, so that a series of operations and steps are performed on the computer or the any other programmable device, thereby generating computer-implemented processing. Therefore, the instructions executed on the computer or the any other programmable device provide steps for implementing the specific function in the one or more processes in the flowcharts and/or in the one or more blocks in the flowcharts.

Obviously, a person skilled in the art can make various modifications and variations to the embodiments of this application without departing from the spirit and scope of this application. In this way, this application is intended to cover these modifications and variations provided that they fall within the scope of protection defined by the following claims and their equivalent technologies.

In this application, the term "including" and a variant thereof may refer to non-limitative inclusion; and the term "or" and a variant thereof may refer to "and/or". In this application, the terms "first", "second", and the like are intended to distinguish between similar objects but do not necessarily indicate a specific order or sequence. "A plurality of" in this application means two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

What is claimed is:

1. A data transmission method, comprising:
obtaining, by a first apparatus, a first link quality packet message comprising link quality information and indication information, wherein the indication information is used to indicate that the link quality information is buffered; and
sending, by the first apparatus, the first link quality packet message to a second apparatus, wherein the first link quality packet message is used for performing network optimization;
wherein the first link quality packet message further comprises status information to indicate a status of a buffering apparatus for buffering the link quality information when the link quality information is buffered, and the status of the buffering apparatus comprises one of the following states: a switching state, a paging state, or a service requesting state.

2. The method according to claim 1, wherein:
the first apparatus is a user plane function (UPF) network element, a radio access network (RAN) node, or a session management function (SMF) network element; and
the obtaining, by the first apparatus, the first link quality packet message comprises:
receiving, by the first apparatus, the first link quality packet message from a terminal apparatus.

3. The method according to claim 1, wherein the first apparatus is a terminal apparatus; and the obtaining, by the first apparatus, the first link quality packet message comprises:
receiving, by the first apparatus, a second link quality packet message comprising the link quality information and the indication information; and
generating, by the first apparatus, the first link quality packet message based on the second link quality packet message.

4. The method according to claim 3, wherein:
the second link quality packet message is generated by a third apparatus based on the link quality information and the indication information after the link quality information is buffered, and
the third apparatus is a user plane function (UPF) network element or a radio access network (RAN) node.

5. The method according to claim 3, wherein the second link quality packet message further comprises status information, and the first link quality message further comprises the status information.

6. The method according to claim 5, wherein the second link quality packet message is generated by a third apparatus based on the link quality information, the indication information, and the status information after the link quality information is buffered, and the third apparatus is a user plane function (UPF) network element or a radio access network (RAN) node.

7. The method according to claim 1, wherein the first apparatus is a terminal apparatus; and the obtaining, by the first apparatus, the first link quality packet message comprises:
obtaining, by the first apparatus, the link quality information; and
when the first apparatus buffers the link quality information, generating, by the first apparatus, the first link quality packet message based on the link quality information and the indication information.

8. The method according to claim 7, wherein the generating the first link quality packet message based on the link quality information and the indication information comprises:
obtaining, by the first apparatus, status information based on a status of the first apparatus; and
generating, by the first apparatus, the first link quality packet message based on the link quality information, the indication information, and the status information, wherein the first link quality packet message further comprises the status information.

9. The method according to claim 1, further comprising:
receiving, by the second apparatus, the first link quality packet message from the first apparatus; and
performing, by the second apparatus, the network optimization based on the first link quality packet message.

10. A first data transmission apparatus, comprising a memory and a processor, wherein the processor executes program instructions in the memory to:
obtain a first link quality packet message, wherein the first link quality packet message comprises link quality information and indication information used to indicate that the link quality information is buffered; and
send the first link quality packet message to a second apparatus, wherein the first link quality packet message is used for performing network optimization;
wherein the first link quality packet message further comprises status information used to indicate a status of a buffering apparatus for buffering the link quality information when the link quality information is buffered, and the status of the buffering apparatus comprises one of the following states: a switching state, a paging state, or a service requesting state.

11. The first apparatus according to claim 10, wherein the first apparatus is a user plane function (UPF) network element, a radio access network (RAN) node, or a session management function (SMF) network element; and the obtaining the first link quality packet message comprises:
receiving the first link quality packet message from a terminal apparatus.

12. The first apparatus according to claim 10, wherein the first apparatus is a terminal apparatus; and the obtaining the first link quality packet message comprises:
receiving a second link quality packet message comprising the link quality information and the indication information; and
generating the first link quality packet message based on the second link quality packet message.

13. The first apparatus according to claim 12, wherein the second link quality packet message is generated by a third apparatus based on the link quality information and the indication information after the link quality information is buffered, and the third apparatus is a user plane function (UPF) network element or a radio access network (RAN) node.

14. The first apparatus according to claim 12, wherein the second link quality packet message further comprises status information, and the first link quality message further comprises the status information.

15. The first apparatus according to claim 10, wherein the first apparatus is a terminal apparatus; and the obtaining the first link quality packet message comprises:
obtaining the link quality information; and
when the apparatus buffers the link quality information, generating the first link quality packet message based on the link quality information and the indication information.

16. The first apparatus according to claim 15, wherein the generating the first link quality packet message based on the link quality information and the indication information comprises:
obtaining status information based on a status of the first apparatus; and
generating the first link quality packet message based on the link quality information, the indication information, and the status information, wherein the first link quality packet message further comprises the status information.

17. A data transmission apparatus, comprising a memory and a processor, wherein the processor executes program instructions in the memory to:
receive a first link quality packet message sent by a first apparatus, wherein the first link quality packet message comprises link quality information and indication information used to indicate that the link quality information is buffered; and perform network optimization based on the first link quality packet message;

wherein the first link quality packet message further comprises status information used to indicate a status of a buffering apparatus for buffering the link quality packet when the link quality information is buffered, and the status comprises one of the following states: a switching state, a paging state, or a service requesting state.

* * * * *